United States Patent [19]
Oizumi et al.

[11] Patent Number: 5,270,857
[45] Date of Patent: Dec. 14, 1993

[54] OPTICAL SYSTEM FOR STABILIZING AN IMAGE

[75] Inventors: Kouji Oizumi, Kanagawa; Nozomu Kitagishi, Tokyo; Shoichi Yamzaki, Kanagawa, all of Japan

[73] Assignee: Canon Kabushiki Kaisha, Tokyo, Japan

[21] Appl. No.: 261,231

[22] Filed: Oct. 24, 1988

[30] Foreign Application Priority Data

Oct. 30, 1987 [JP] Japan ............... 62-274962
Jan. 26, 1988 [JP] Japan ............... 63-015411
Jan. 26, 1988 [JP] Japan ............... 63-015412
Jan. 26, 1988 [JP] Japan ............... 63-015413
Jul. 26, 1988 [JP] Japan ............... 63-186536

[51] Int. Cl.$^5$ .................. G02B 27/64
[52] U.S. Cl. .................. 359/554; 359/557
[58] Field of Search ............ 350/429, 427, 465, 426, 350/255, 423, 431, 247, 500, 571, 463, 475; 250/201; 356/248, 250; 359/554-557, 676, 677

[56] References Cited

U.S. PATENT DOCUMENTS

| | | | |
|---|---|---|---|
| 3,942,862 | 3/1976 | Furukawa et al. | 359/557 |
| 3,953,106 | 4/1976 | Furukawa et al. | 359/557 |
| 4,043,642 | 8/1977 | Hirose et al. | 350/429 |
| 4,387,970 | 6/1983 | Brueggmann | 350/463 |
| 4,417,281 | 11/1983 | Hama | 350/429 |
| 4,682,860 | 7/1987 | Tanaka et al. | 350/423 |
| 4,757,336 | 7/1988 | Nakayama et al. | 350/423 |
| 4,844,602 | 7/1989 | Kitagishi et al. | 350/500 |
| 4,907,868 | 3/1990 | Kitagishi et al. | 350/500 |
| 4,927,250 | 5/1990 | Suda | 359/557 |
| 4,974,950 | 12/1990 | Yamazaki et al. | 350/500 |
| 5,000,549 | 3/1991 | Yamazaki | 359/557 |

FOREIGN PATENT DOCUMENTS 50-80147 6/1975 Japan.
55-21133 2/1981 Japan.
56-34847 4/1981 Japan.
57-07414 1/1982 Japan.
61-223819 10/1986 Japan.

Primary Examiner—Bruce Y. Arnold
Assistant Examiner—Thong Nguyen
Attorney, Agent, or Firm—Fitzpatrick, Cella, Harper & Scinto

[57] ABSTRACT

An image stabilizing system includes a photographic lens device having a plurality of lens units, wherein for zooming at least one lens unit separation varies, a detecting circuit for detecting the jiggle of the system, and a drive device for driving at least one lens unit in a direction perpendicular to a photographic optical axis of the photographic lens device on the basis of an output of the detecting circuit to stabilize an image.

33 Claims, 28 Drawing Sheets

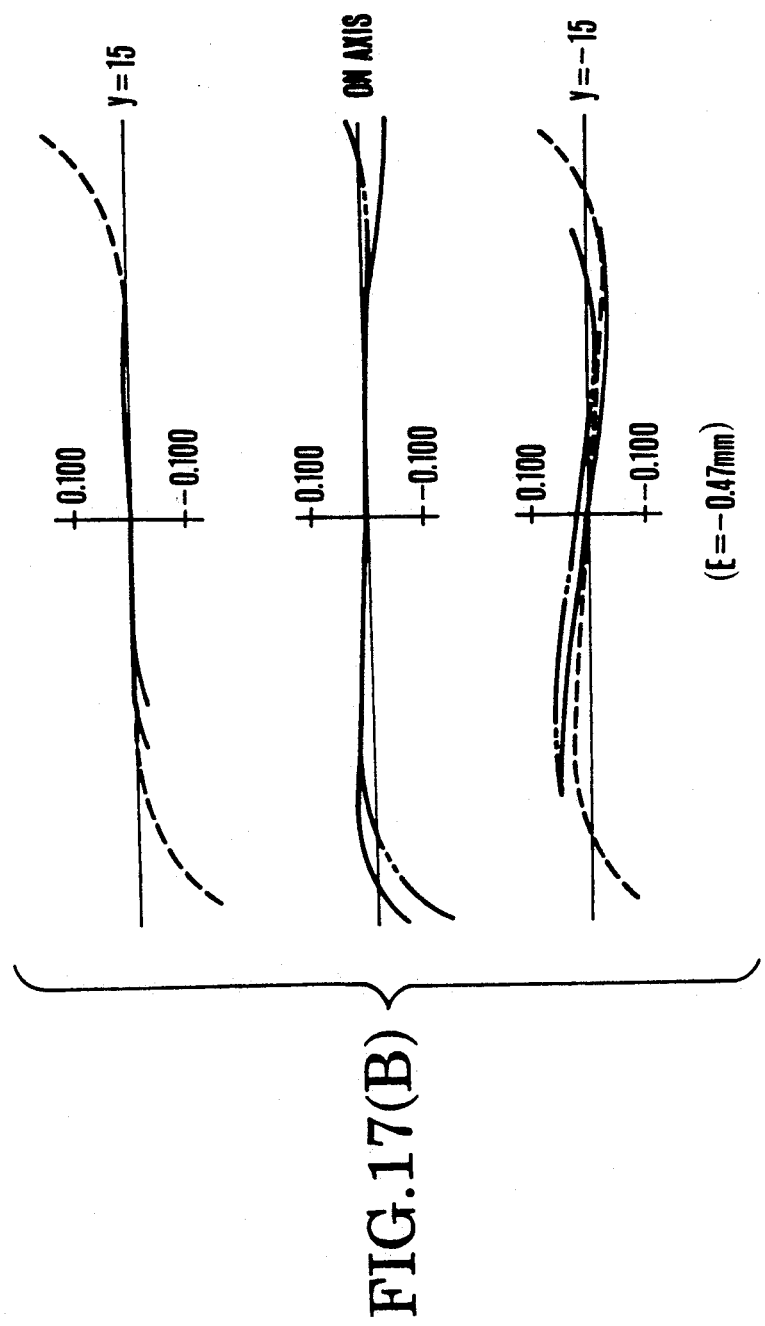

OPTICAL SYSTEM FOR STABILIZING AN IMAGE

BACKGROUND OF THE INVENTION

1. Field of the Invention

This invention relates to variable magnification optical systems having a function of stabilizing a photographic image that has moved by the vibration of the camera and, more particularly, to variable magnification optical systems having the image stabilizing function which has achieved minimization of the size and weight of the compensating lens unit for image stabilization and to prevent a lowering of optical performance when the compensating lens unit is moved, for example, in a direction perpendicular to the optical axis to play role of the image stabilizing effect and also has achieved improvement of the control performance of the actuator.

2. Description of the Related Art

When shooting from a moving car, flying aircraft, or other moving body, vibrations are propagated to the photographic system and deviation of the camera's image from the line of sight takes place.

Vibration-proof optical systems having the function of preventing deviation of the camera's image have been proposed in, for example, Japanese Laid-Open Patent Application No. Sho 50-80147, Japanese Patent Publication No. Sho 56-21133 and Japanese Laid-Open Patent application No. Sho 61-223819.

In the document of Japanese Laid-Open Patent Application No. Sho 50-80147, the zoom lens having two afocal magnification varying units performs variation of the image magnification in such a way that the angular magnification $M_1$ of the first magnification varying unit and the angular magnification $M_2$ of the second magnification varying unit have the relation of $M_1 = 1 - (1/M_2)$ and the second magnification varying unit is operatively connected to the gimbal mechanism to compensate for deviation of the image, thus achieving stabilization of the image.

In Japanese Patent Publication No. Sho 56-21133, stabilization of the image is achieved by moving a different optical member from the zoom units to such a direction as to cancel the vibratory displacement of the image due to the vibration depending on the output signal of detecting means for detecting the vibrated state of the optical instrument.

Japanese Laid-Open Patent Application No. Sho 61-223819 discloses that in the photographic system having a refraction type variable vertical angle prism arranged at the frontmost position, the vertical angle of that refraction type variable vertical angle prism is made to vary in correspondence to the vibration of the photographic system, causing the image to deflect. Thus, the stabilization of the image is achieved.

Besides these, Japanese Patent Publications Nos. Sho 56-34847 and 57-7414 disclose that an optical member constituting part of the photographic system is spatially fixed by using a gyro or like mechanism to produce a prism effect as the instrument vibrates. By utilizing this effect, the instrument's image is deflected to obtain a stabilized image on the focal plane.

Also, another method of obtaining the stabilized image is even adopted wherein by utilizing the acceleration sensor, the vibration of a photographic system which is constructed from the single focal length is detected. In response to the thus-obtained signal, part of the photographic system, or a lens unit, is made to vibrate in a direction perpendicular to the optical axis. As its examples there are U.S. patent application Ser. No. 116,541 filed Nov. 4 1987, now U.S. Pat. No. 4,844,602 Ser. No. 116,668 filed Nov. 4, 1987, now abandoned Ser. No. 156,930 filed Feb. 17, 1988, now U.S. Pat. No. 4,907,868 and Ser. No. 896,639 filed Aug. 15, 1986 now abandoned.

In general, the mechanism for obtaining the stabilized image by vibrating the lens unit of part of the photographic system to remove the deviation of the photographic image is required to have a good responsiveness.

For this reason, the size and weight of the compensating lens unit must be as far minimized as possible and the inertial mass must be reduced. Further, the relation between the amount of compensation for the deviation of the image and the amount of movement of the compensating lens unit must be so much simplified as to shorten the computation time for their conversion. When these requirements are fulfilled, realization of the desired photographic system is achieved.

Also, when the compensating lens unit is decentered, decentering coma, decentering astigmatism and decentering curvature of field are produced to large degrees. Hence the compensated image to the deviation has its sharpness decreased by the decentering aberrations. For example, when large decentering distortion is produced, the amount of movement of the image on the optical axis and the amount of movement of the image in the marginal zone become different from each other. From this reason, when the compensating lens unit is decentered to compensate for the deviation of the image in respect to the paraxial region thereof, it, is in the marginal zone that a similar phenomenon to the defocusing of the image comes to appear, becoming a cause of extremely lowering the optical performance.

Thus, in the photographic system for image stabilization, particularly the variable magnification optical system, it is required that when the compensating lens unit is moved in a direction perpendicular to the optical axis to a decentered state, the amounts of decentering aberrations produced are little and the lowering of the optical performance is little.

However, it is generally very difficult to obtain a variable magnification optical system which has satisfied all the above-described various conditions. Particularly when the lens unit having a refractive power which constitutes part of the photographic system is decentered, the optical performance lowers largely, thus giving rise to a drawback that a good image cannot be obtained.

SUMMARY OF THE INVENTION

A first object of the present invention is to provide an image stabilizing device suited to the variable magnification optical system.

A second object is to provide an image stabilizing optical system which maintains the optical performance excellent.

BRIEF DESCRIPTION OF THE DRAWINGS

FIGS. 15(A)-15(D), FIGS. 16(A)-16(D) and FIGS. 17(A)-17(D) are various aberration diagrams of the numerical examples 2-4 of the variable magnification optical system according to the invention.

DETAILED DESCRIPTION OF THE PREFERRED EMBODIMENTS

Figure 1A:
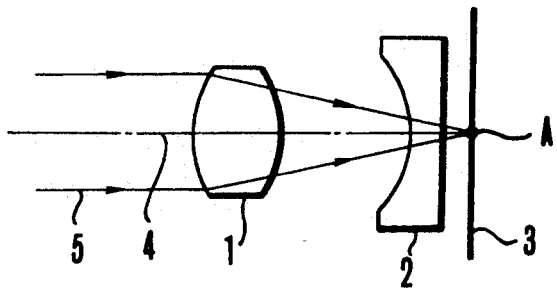
FIGS. 1(A), 1(B), 2(A), 2(B), 3(A), 3(B), 4(A), 4(B), 5(A), 5(B), 6(A) and 6(B) are schematic diagrams of embodiments of methods for compensating for the deviation of the image in the variable magnification optical systems of the present invention.
Figure 1B:
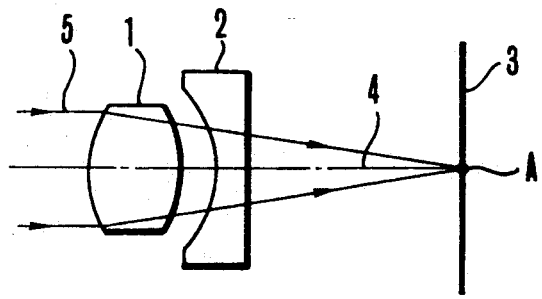
Figure 2A:
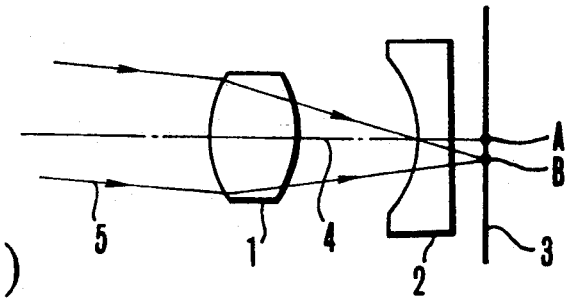
Figure 2B:
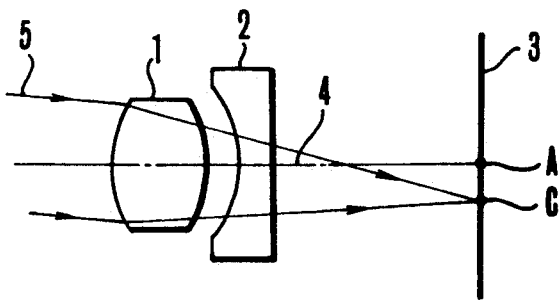
Figure 3A:
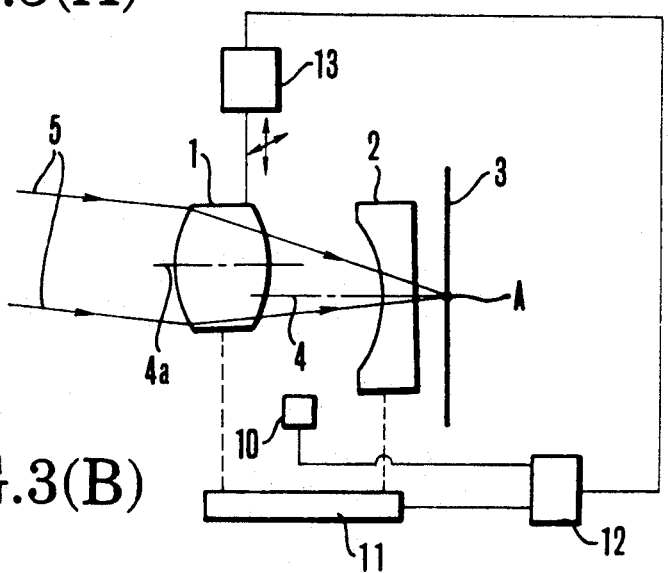
Figure 3B:
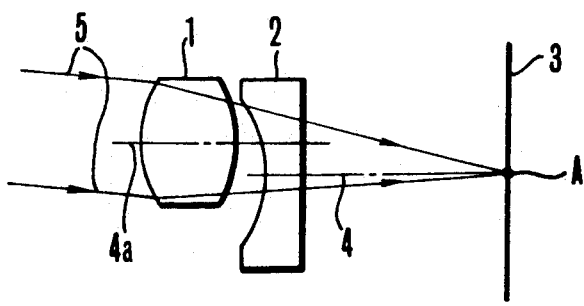

FIG. 1(A)-FIG. 3(B) are schematic diagrams to show the principle for obtaining a stabilized image when the image is deviated, for example, by the vibration in the variable magnification optical system according to the invention. The variable magnification optical system shown in the same figures comprises, from front to rear, a first lens unit 1 of positive refractive power and a second lens unit 2 of negative refractive power, totaling two lens units with the axial separation therebetween being varied to effect variation of the image magnification, and the first lens unit 1 being axially moved to effect focusing, and represents the so-called 2-unit zoom lens. Incidentally, 5 is a light beam focusing at a point A on an image plane 3, and 4 is an optical axis of the variable magnification optical system. FIGS. 1(A), 2(A) and 3(A) show the optical arrangement of the wide angle end, and FIGS. 1(B), 2(B) and 3(B) show the optical arrangement of the telephoto end. It should be noted that although each lens unit is depicted as a singlet lens for the purpose of convenience, it is actually constructed with a plurality of lenses.

FIGS. 1(A) and 1(B) are schematic diagrams of the optical system where there is no vibration and no deviation of the image. The light beam 5 because of no vibration and no deviation of the image focuses at one point A on the image plane 3 in the wide angle end and in the telephoto end.

FIGS. 2(A) and 2(B) are schematic diagrams of the optical system where a vibration propagates to the variable magnification optical system to deviate the image. In FIGS. 2(A) and 2(B), for the purpose of simplicity, in the wide angle side and the telephoto side, there are shown the focusing states due to the deviation of the light beam where the variable magnification optical system tilts as a whole about the point A with the front downward. The light beam 5 which should primarily focus at the point A is focusing at a point B on the image plane 3 when on the wide angle side, or at a point C on the image plane 3 when on the telephoto side.

Now, a film exposure is in progress. When a deviation of the image takes place as the variable magnification optical system tilts monotonously from the state shown in FIG. 1(A) to the state shown in FIG. 2(A), the image which, if there is no deviation, would focus at the point A as a point image is formed as a dull image of the line segment AB on the wide angle side, or of the line segment AC on the telephoto side.

FIGS. 3(A) and 3(B) are schematic diagrams where compensation of stabilizing the image against the deviation of the image of FIGS. 2(A) and 2(B) has been done. In FIGS. 3(A) and 3(B), the first lens unit 1 is made to be the compensating lens unit for deviation compensation and to parallel-decenter in a direction perpendicular to the optical axis 4 to compensate for the deviation of the image. In the figures, an optical axis 4a of the first lens unit 1 is substantially parallel to the optical axis 4 which, before the compensation for the deviation, was the common optical axis of the first lens unit 1 and the second lens unit 2. A detector unit 10 for detecting a jiggle of the zoom lens barrel comprises an acceleration sensor. 11 is another detector unit for detecting the position of each of the lens units 1 and 2, or a device for obtaining the lateral magnification of each lens unit. A computing circuit 12 computes the amount of movement of the compensating lens unit 1 on the basis of the output signals of the detector unit 10 and the position detector unit 11. 13 is a drive device.

As shown in FIGS. 3(A) and 3(B), by parallel-decentering the first lens unit 1 by a predetermined amount relative to the deviation of the image due to the downward tilt of the front of the entirety of the variable magnification optical system, it is made possible that a light beam 5 which would otherwise focus at the point B in the wide angle end and at the point C in the telephoto end as shown in FIGS. 2(A) and 2(B) are brought into focus at the point A which is originally the image point.

In such a manner, stabilization of the image is achieved by parallel-decentering the first lens unit 1. It should be noted that in this embodiment the second lens unit 2 may be parallel-decentered instead of the first lens unit 1. Even if so, the deviation of the image can similarly be compensated for. This is valid in the 4-unit type zoom lens to be described below too.

Figure 4A:
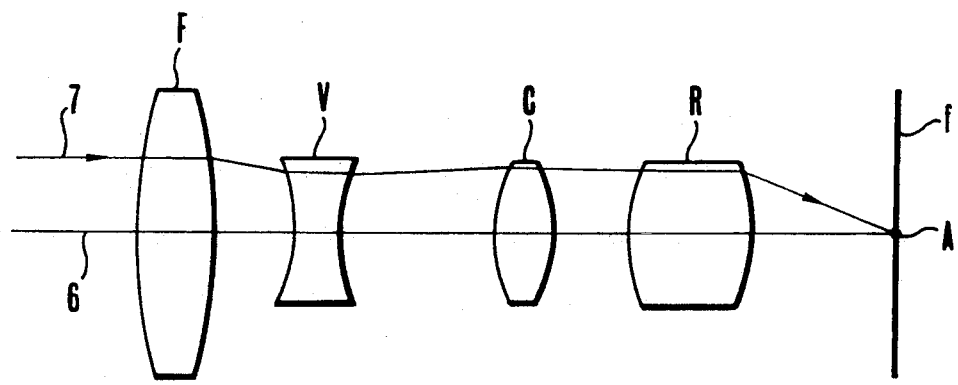
Figure 4B:
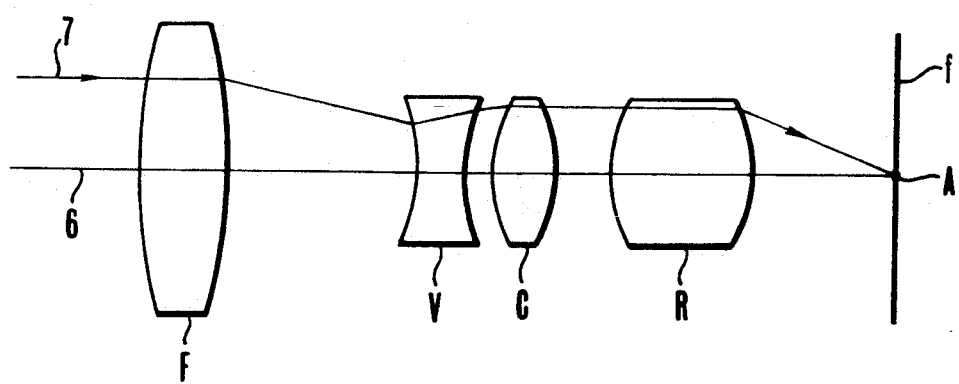
Figure 5A:
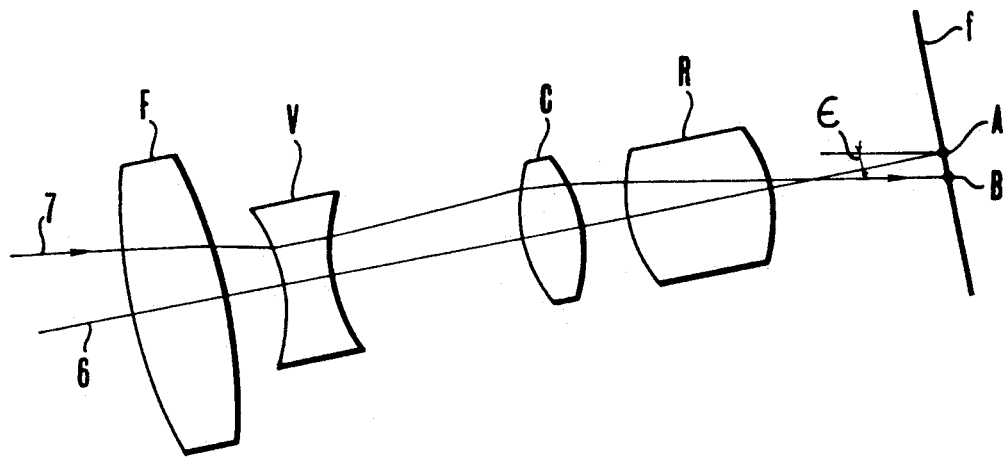
Figure 5B:
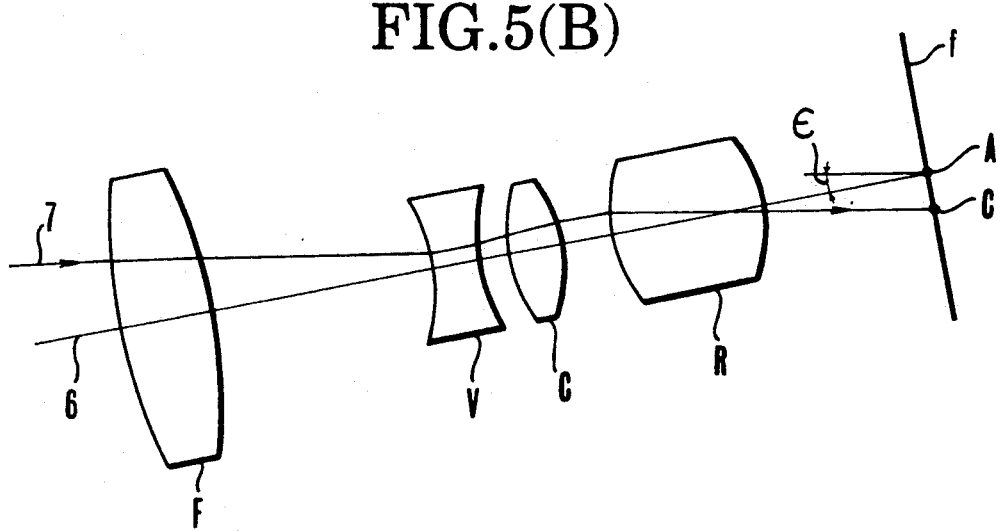
Figure 6A:
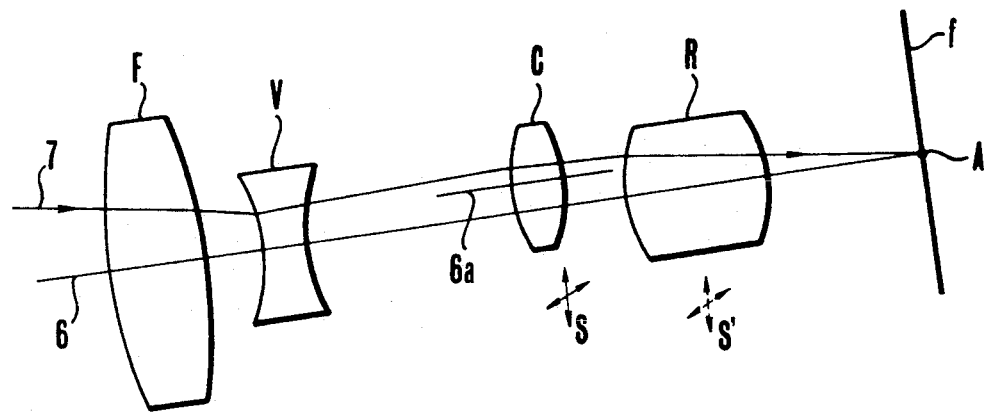
Figure 6B:
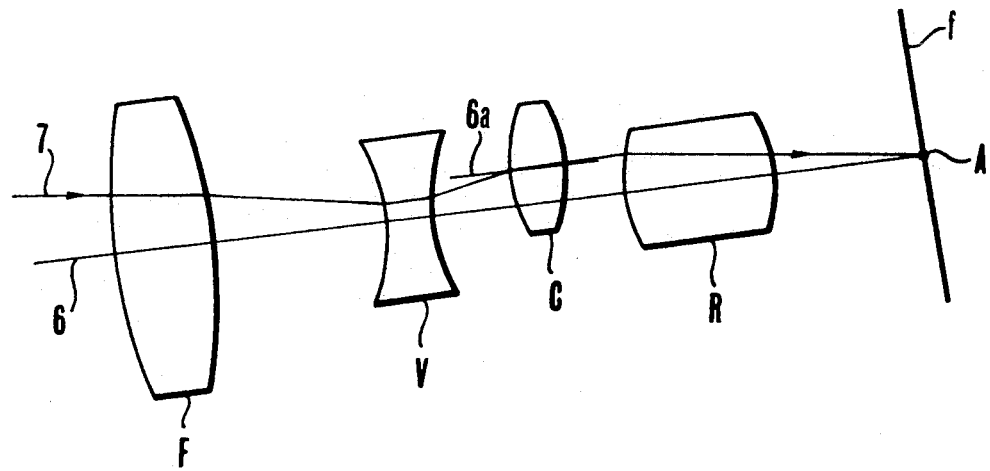

The variable magnification optical system shown in FIGS. 4(A)-6(B) comprises, from front to rear, a first lens unit F of positive refractive power, a second lens unit V as the variator of negative refractive power, a third lens unit C as the compensator of positive refractive power and a fourth lens unit R as the relay lens of positive refractive power, totaling four lens units with the first lens unit F being axially moved to effect focusing, and represents the so-called 4-unit zoom lens. Incidentally, 7 is a light beam focusing at a point A on an image plane f, and 6 is an optical axis of the variable magnification optical system. FIGS. 4(A), 5(A) and 6(A) show the optical arrangement of the wide angle end and FIGS. 4(B), 5(B) and 6(B) show the one of the telephoto end.

FIGS. 4(A) and 4(B) are schematic diagrams of the optical system where no vibration occurs so there is no deviation of the image. The light beam 7 because of no occurrence of vibration and no deviation of the image focuses at one point A on the image plane f.

FIGS. 5(A) and 5(B) are schematic diagrams of the optical system where vibrations have propagated to the variable magnification optical system and the image has deviated. In FIGS. 5(A) and 5(B), for the purpose of simplicity, in the wide angle side and the telephoto side, there are shown focusing states due to the deviation of the light beam when the entirety of the variable magnification optical system has front tilted about the point A downward by an angle E to deviate the image.

That is, the light beam 7 which should primarily focus at the point A focuses at a point B on the image plane f on the wide angle side and at a point C on the image plane f on the telephoto side.

Now, a film exposure is in progress. In a case when deviation of the image takes place as the variable magnification optical system tilts monotonously from the state shown in FIG. 4(A) to the state shown in FIG. 5(A), the image which, if there is no deviation, would focus at the point A as a point image is formed as a dull image of a line segment AB on the wide angle side, or of a line segment AC on the telephoto side.

FIGS. 6(A) and 6(B) are schematic diagrams where compensation is made for the deviation of the image of FIGS. 5(A) and 5(B). In FIGS. 6(A) and 6(B), the third lens unit C is made to be the compensating lens unit for deviation compensation and to parallel-decenter in a direction perpendicular to the optical axis 6 to compensate for the deviation of the image. In the figures, an optical axis 6a of the third lens unit C is substantially parallel to the optical axis 6 of the variable magnification optical system which was the common axis before the compensation for the deviation.

As shown in FIGS. 6(A) and 6(B), for the deviation of the image due to the front downward tilt of the entirety of the variable magnification optical system, the third lens unit C is parallel-decentered by a predetermined amount on a plane orthogonal to the optical axis as indicated by arrows S, whereby the light beam 7 which would otherwise focus at the point B on the wide angle side, or at the point C on the telephoto side as shown in FIGS. 5(A) and 5(B) can be brought to focus at the point A which is initially the image point.

As another embodiment, the fixed fourth lens unit R may otherwise be decentered as shown by arrows S'. Even in this case, the compensation can be done.

In such a manner, stabilization of the image is achieved by parallel-decentering the compensating lens unit.

In general, the parallel-decenter amount E of the compensating lens unit as a function of the image deviation $\delta y$ in terms of the decenter responsiveness S of the compensating lens unit becomes $$E = -\delta y / S \quad (1)$$

Here, the image deviation amount $\delta y$ is the length of the line segment AB on the wide angle side, or of the line segment AC on the telephoto side with addition of a minus sign.

This is because the signs of the E and $\delta y$ are made to be plus when above the optical axis, and to be minus when below it.

The decenter responsiveness S is the ratio of the amount of movement of the image point on the focal plane to the parallel-decenter amount of the compensating lens unit.

In this embodiment, the image deviation amount $\delta y$ is detected by the deviation detecting means such as the acceleration sensor provided in the interior of the camera and, on the basis of the decenter responsiveness S of the compensating lens unit inherent in the variable magnification optical system, the parallel-decenter amount E of the compensating lens unit for compensation of the deviation of the image is obtained from the equation (1). And, by the drive means the compensating lens unit is decentered to the predetermined amount, thus compensating for the deviation of the image.

It should be noted that the present invention is not confined to the above-described zoom lens of the 2-unit type or zoom lens of the 4-unit type, but is applicable to any other types of variable magnification optical systems provided the variable magnification optical systems are constructed to have at least one lens unit on the object side and image side of the compensating lens unit (which, in FIG. 4(A)-FIG. 6(B), corresponds to the third lens unit C) and at least one of the air separations between the compensating lens unit and its adjacent lens units varies at least when zooming or when focusing.

For example, in application to a zoom lens having three lens units of which the first, second and third counting from front are respectively of negative, positive and negative refractive powers or of positive, negative and positive refractive powers, and of which at least two are moved to perform variation of the image magnification, or to the 3-unit type of zoom lens, no obstacle will be encountered, when so applied to a zoom lens, in which at least two lens units are moved for variation and magnification. Also, even if the zoom lens is of the 4-unit type, the invention can be applied to the one having, from front to rear, positive, negative, negative and positive refractive powers, or positive, negative, positive and negative refractive powers.

Next, in the general variable magnification optical system, the relation between the amount of deviation of the image and the amount of movement of the compensating lens necessary to compensate that amount of deviation will be explained. The deviation amount is detectable in various forms by various kinds of deviation detecting means, and for example this deviation amount detectable by an accelerating sensor is shown as to $|\delta y|$.

Now, when the variable magnification optical system has tilted by an angle $\epsilon$ as shown in FIGS. 5(A) and 5(B), the image deviation amount $\delta y$ on the image plane in terms of the overall focal length f of the variable magnification optical system becomes $$\delta y = f \cdot \epsilon \quad (2)$$

With this, letting the paraxial lateral magnification of the compensating lens unit for compensating for the deviation of the image be denoted by $\beta_p$ and the paraxial lateral magnification of the entire lens system by $\beta_q$, the decenter responsiveness SP of the compensating lens unit becomes $$SP = (1 - \beta_p) \cdot \beta_q \quad (3)$$

Since S of the equation (1) and SP of the equation (2) can be treated as the same, by putting S=SP, from the equations (2) and (3), the equation (1) becomes $$E = -f \cdot \epsilon / ((1 - \beta_p) \cdot \beta_q) \quad (4)$$

In the equation (4), $f/(1-Bp) \cdot Bq$ is the constant inherent in the zooming position of the variable magnification optical system. Putting this as the compensation constant K for the deviation of the image, the equation (4) can be expressed in a very simple form by $$E = K \cdot \epsilon \quad (5)$$

In actual practice, however, various object distances and various states of production of aberrations must be taken into account when the image stabilization is achieved.

Therefore, it is recommended that the equation (4) is approximately dealt with for the purpose of advantageously stabilizing the image.

In this embodiment, the various compensation constants of the aforesaid plurality of lens units are so determined that when the photographic image has deviated as the variable magnification optical system tilted an angle $\epsilon$ as a whole, the aforesaid compensating lens unit is parallel-decentered by about $-f\cdot\epsilon/((1-\beta_p)\cdot\beta_q)$ so that that deviation of the photographic image is compensated for.

It should be noted that while the lateral magnification $\beta_p$ is detected, for example, by the above-described lens position detector unit 11 shown in FIG. 3(A), the focal length f of the entire lens system also is simultaneously detected by the detector unit 11. It should be also noted that the amount of movement of the compensating lens unit is computed by the computing circuit 12 on the basis of the output results of the detector unit 10 and the position detector unit 11. In the following embodiments also, the position detector unit 11, the detector unit 10 and the computing circuit 12 though omitted in the drawings, are provided similarly to that shown in FIG. 3(A).

It should be noted that in this embodiment, to well compensate for the deviation of the image with the production of, in particular, decentering aberrations reduced to a minimum, it is good to construct the variable magnification optical system so as to satisfy $$|(1-\beta_p)\cdot\beta_q| > 0.1 \tag{$A_0$}$$

When the inequality of condition ($A_0$) is violated, it is no good, because the amount of movement of the compensating lens unit for compensating for the deviation of the image increases and the lens outer diameter of the compensating lens unit increases.

Next, on the production of decentering aberrations at the time of compensating for the deviation of the image by moving the compensating lens unit in a direction perpendicular to the optical axis in the arbitrary arrangement of lens unit having different refractive power in sign, from the standpoint of aberration theory, discussion is made on the basis of the method shown by Matsui in the 23rd Applied Physics Lecture Meeting in Japan (1962).

When a lens unit which is part of the variable magnification optical system is parallel-decentered by a distance E, the aberration amount $\Delta Y_1$ of the entire lens system becomes the sum of the aberration amount $\Delta Y$ before the decentering and the decentering aberration amount $\Delta Y(E)$ produced by the decentering, as shown below by an equation (a). Here, the aberration amount $\Delta Y$ as shown by an equation (b) is represented by spherical aberration (I), coma (II), astigmatism (III), Petzval sum (P), distortion (V).

Also, the decentering aberration amount $AY(E)$ as shown by an equation (c) is represented by primary decentering coma (IIE), primary decentering astigmatism (IIIE), primary decentering curvature of field (PE), primary decentering distortion (VE1), primary decentering surplus distortion (VE2) and primary original point shift ($\Delta E$).

Also, the original point shift ($\Delta E$), primary decentering coma (IIE), primary decentering astigmatism (IIIE), primary decentering curvature of field (PE), primary decentering distortion (VE1), and primary decentering surplus distortion (VE2) are as shown by equations (d) to (i) below. In the equations, Ip represents the spherical aberration coefficient of the compensation lens P, IIp is the coma aberration coefficient, IIIp is the astigmatism aberration coefficient, Pp is the Petzval sum, Vp is the distortion aberration coefficient. Iq is the spherical aberration coefficient of each of the lenses q arranged on the image side of the lens P, IIq is the coma aberration coefficient, IIIq is the astigmatism aberration coefficient, Pq is the Petzval sum, and Vq is the distortion aberration coefficient. $\alpha p$ is the converted incidence angle of the on-axis light ray incident on the compensating lens p, p is the converted exit angle, $\overline{\alpha'p}$ is the converted incidence angle of the off-axis light ray incident on the eye-center of the compensating lens p, and $\overline{\alpha'p}$ is the converted exit angle. N1 is the refractive index of the medium on the object side, w is the picture angle, $\phi R$ is the azimuth on the entrance pupil, $\phi\omega$ is the azimuth on the image surface, and R is the magnitude (radius) of the entrance pupil.

$$\Delta Y_1 = \Delta Y + \Delta Y(E) \tag{a}$$

$$\Delta Y = -\frac{1}{2\alpha'_k}[(N_1\tan\omega)^3\cos\phi_\omega \cdot V + \tag{b}$$
$$(N_1\tan\omega)^2 R\{2\cos\phi_\omega\cos(\phi_R - \phi_\omega)\cdot III + \cos\phi_R(III + P)\} +$$
$$(N_1\tan\omega)R^2\{2\cos\phi_R\cos(\phi_R - \phi_\omega) + \cos\phi_\omega\}\cdot II + R^3\cos\phi_R \cdot I]$$

$$\Delta Y(E) = -\frac{E}{2\alpha'_k}[(N_1\tan\omega)^2\{(2+\cos2\phi_\omega)(VE1) - \tag{c}$$
$$(VE2)\} + 2(N_1\tan\omega)R[\{2\cos(\phi_R - \phi_\omega) + \cos(\phi_R + \phi_\omega)\}(IIIE) + \cos\phi_R\cos\phi_\omega(PE)] +$$
$$R^2(2+\cos2\phi_R)(IIE)] - \frac{E}{2\alpha'_k}(\Delta E)$$

$$(\Delta E) = -2(\alpha'_p - \alpha_p) = -2h_p\phi_p \tag{d}$$

$$(IIE) = \alpha'_p II_q - \alpha_p(II_p + II_q) - \tag{e}$$
$$\alpha'_p I_q + \alpha_p(I_p + I_q)$$
$$= h_p\phi_p II_q - \alpha_p II_p - (h_p\phi_p I_q - \alpha_p I_p)$$

$$(IIIE) = \alpha'_p III_q - \alpha_p(III_p + III_q) - \tag{f}$$
$$\alpha'_p II_q + \alpha_p(II_p + II_q)$$
$$= h_p\phi_p III_q - \alpha_p III_p - (h_p\phi_p II_q - \alpha_p II_p)$$

$$(PE) = \alpha'_p P_q - \alpha_p(P_p + P_q) \tag{g}$$
$$= h_p\phi_p P_q - \alpha_p P_p$$

$$(VE1) = \alpha'_p V_q - \alpha_p(V_p + V_q) - \tag{h}$$
$$\alpha'_p III_q + \alpha_p(III_p + III_q)$$
$$= h_p\phi_p V_q - \alpha_p V_p - (h_p\phi_p III_q - \alpha_p III_p)$$

$$(VE2) = \alpha'_p P_q - \alpha_p(P_p + P_q) \tag{i}$$
$$= h_p\phi_p P_q - \alpha_p P_p$$

From the foregoing equations, to minimize the production of the decentering aberrations, it becomes necessary either to make small the values of the various aberration coefficients Ip, IIp, IIIp, Pp, Vp of the compensating lens unit, or to set the various aberration coefficients in so good balance as to cancel each other as shown by the equation (a)-equation (i). And in the compensating lens unit, besides the spherical aberration, coma and Petzval sum, it becomes necessary to well correct the astigmatism and distortion.

To correct the off-axis aberrations along with the on-axis aberrations in good balance in the compensating lens unit, it generally becomes necessary to design the lens system in such a way that the height h of the on-axis light ray in the compensating lens unit and the height h of the principal ray of the off-axis light beam take different values from each other. The height "h" represents the height of the on-axis light beam from the optical axis, and "h̄" represents the height from the optical axis at which the off-axis light beam passing the pupil center will pass the lens group, p.

For this reason, in this embodiment, the compensating lens unit is constructed from a plurality of lenses as shown in numerical examples to be described later, and the compensating lens unit in the variable magnification optical system is set forth as has been described above, whereby the amount of decentering aberrations produced by decentering the compensating lens unit is lessened.

In general, in the variable magnification optical system, there are many cases that the lens unit which axially moves when zooming or when focusing, or an adjacent lens unit to that lens unit, is either corrected relatively well in itself, or in its neighborhood there exists a lens unit which is to correct the aberrations in good balance. In other words, in a lens system comprising a plurality of lenses with one fixed focal point, if one lens produces a large aberration the compensation can be by another lens having a reverse aberration, thus keeping the whole system in balance. However, in a lens system such as a focusing or zooming system, where part of the whole system is moved, it is necessary that each lens to be moved itself has enough aberration correction. Also, even in the case of considering the composite system of that lens unit and the adjacent lens unit, each aberration is often corrected well.

For this reason, the compensating lens unit which lies in such a position that at least when varying the image magnification or when focusing, the adjoining lens unit separation varies is made to be the compensating lens unit for compensating for the deviation of the image. By moving this lens unit in a direction perpendicular to the optical axis, the deviation of the image is well compensated for, while minimizing the production of the decentering aberrations.

With the foregoing discussion in mind, conditions for pulling out the desired performance in the zoom lens having the function of stabilizing the image are described below.

That is, it is a variable magnification optical system having at least one lens unit on the object side and image side of the compensating lens unit and arranged so that at least one of the separations between that compensating lens unit and its adjacent lens units varies at least when varying the image magnification or when focusing, wherein the deviation of the photographic image is compensated for by detecting the deviation of the photographic image produced by the tilting of that variable magnification optical system and moving the aforesaid compensating lens unit in the direction almost perpendicular to the optical axis, and the following conditions are satisfied:

$$0.1 < |(1-\beta p)\cdot \beta q| < 10 \quad (A1)$$

$$0.02 < |fP/fT| < 5 \quad (A2)$$

where fP is the focal length of the compensating lens unit, fT is the focal length of the entire lens system in the telephoto end, βp is the paraxial lateral magnification of the compensating lens unit in an arbitrary magnification varying position, and βq is the paraxial lateral magnification of the entirety of that lens system which is arranged on the image side of the compensating lens unit.

Next, the technical significance of the above-described inequalities of conditions (A1) and (A2) will be explained.

When the lower limit of the inequalities of condition (A1) is exceeded, the decenter responsiveness of the compensating lens unit for compensating for the deviation of the image becomes too small, so that the amount of movement of the compensating lens unit relative to the predetermined amount of deviation of the image increases. It is no good because the size of the drive mechanism comes to increase.

Also, when the upper limit is exceeded, the amount of movement of the compensating lens unit at the time of compensating for the deviation of the image decreases, but the decenter responsiveness increases. This is no good because it leads to the necessity of a very accurate drive mechanism.

When the refractive power of the compensating lens unit becomes strong beyond the lower limit of the inequalities of condition (A2), the decenter responsiveness becomes too large and it becomes difficult to correct the various aberrations such as decentering coma and decentering astigmatism in good balance. The conditional formula "A2" shows a ratio of the focal length of the compensation lens unit to the focal length of the whole lens system at the telephoto end. If this ratio is beyond the lower limit, the refraction power of the compensation lens unit becomes stronger. Also, when the refractive power of the compensating lens unit becomes too weak, the amount of movement of the compensating lens unit at the time of compensating for the deviation of the image increases. This is no good because the size of the drive mechanism comes to increase.

Further, in this embodiment, when the deviation of the image is compensated for by decentering the compensating lens unit, to further correct the decentering aberrations well, it is preferred either to satisfy the following condition:

$$0.1 < |fO/fP| < 10 \quad (A3)$$

where fO is the focal length of the entirety of that lens system which is arranged on the object side of the compensating lens unit in an arbitrary image magnification varying position,
or to satisfy the following condition:

$$0.1 < |fq/fP| < 10 \quad (A4)$$

where fq is the focal length of the entirety of that lens system which is arranged on the image side of the compensating lens unit in an arbitrary magnification varying position.

The inequalities of conditions (A3) and (A4) are to properly hold the refractive power of the lens units of the object side or the image side of the compensating lens unit for compensating for the deviation of the image so that the amount of decentering aberrations produced when the deviation of the image is compensated for by decentering the compensating lens unit is lessened for the purpose of maintaining good optical performance. In a case where it satisfies neither of the inequalities of conditions (A3) and (A4), when the compensating lens unit is decentered, large decentering aberrations are produced. This is no good because the optical performance comes to lower.

Next, a condition suited particularly to the case that the frontmost lens unit in the zoom lens system is treated as the compensating lens is shown below.

A variable magnification optical system having a plurality of lens units arranged so that the separation between the first lens unit and the second lens unit counting from the object side varies at least when varying the image magnification or when focusing, wherein the deviation of the photographic image resulting from the tilting of that variable magnification optical system is detected by deviation detecting means and the first lens unit is moved in a direction perpendicular to the optical axis by drive means in response to the output signal from the deviation detecting means to thereby compensate for the deviation of the image, and letting the focal length of the first lens unit be denoted by f1 and the focal length of the entire lens system in the telephoto end by fT, the following condition:

$$0.2 < |f1/fT| < 5 \qquad (A5)$$

is satisfied.

In this embodiment, by setting forth the refractive power of the first lens unit as the above-described inequalities of condition (A5), the deviation of the image is compensated for by the first lens unit, and the optical performance is prevented from lowering when the first lens unit is parallel-decentered.

When the refractive power of the first lens unit comes to be strong beyond the lower limit of the inequalities of condition (A5), the decenter responsiveness gets larger so that the amount of movement in a direction perpendicular to the optical axis for compensating for the deviation of the image can be decreased. Since the first lens unit respectively moves in the optical axis direction for zooming and in a direction vertical to the optical axis respectfully for image decentering, it becomes necessary to accurately position the lens unit and high accuracy is required to hold the lens. In particular, the image shift relative to the variation of the image magnification on the optical axis becomes very large. This is no good because a very accurate lens holding mechanism is necessary, and further the number of constituent lenses of the first lens unit must be increased to well correct the various aberrations.

Also, when the refractive power of the first lens unit comes to be weak beyond the upper limit of the inequalities of condition (A5), the first lens unit must be moved by a longer distance in a direction perpendicular to the optical axis to compensate for the deviation of the image. Therefore, the effective diameter of the first lens unit increases, and the size comes to increase.

It should be noted that in the case of performing compensation by the first lens unit, letting the focal length of the first lens unit be denoted by f1, the decenter amount E is expressed by the equation:

$$E = -f1 \cdot \epsilon$$

According to this equation, in a case where the first lens unit in the variable magnification optical system is made to parallel-decenter to compensate for the deviation of the image, the parallel decenter amount E of the first lens unit becomes irrelevant to the magnification varying position of the variable magnification optical system. That is, when the tilting is by the angle $\epsilon$, the parallel decentering by $|f1 \cdot \epsilon|$ suffices for the possibility of compensating for the deviation of the image. In such a manner, in this embodiment, the parallel decenter amount E can be found from the focal length f1 of the first lens unit and the tilt angle $\epsilon$. The decenter responsiveness, S, represents the amount of movement of the image relative to the amount of decentering of the compensation lens unit. It is known that responsiveness may be expressed by a general formula:

$$S = (1 - \beta p)\beta q$$

wherein $\beta p$ is the magnification of the compensation lens unit, and $\beta q$ is the magnification of the lenses arranged on the image side of the compensation lens unit.

In this case, when the lens unit located closest to the object is supposed to be the compensation lens unit:

$$\beta p = 0, \text{ hence } S = \beta q$$

On the other hand, if the lens unit located closest to the image is supposed to be the compensation lens unit:

$$\beta q = 1, \text{ hence } S = 1 - \beta p$$

because there is no lens on the image side of the compensation lens unit.

In the meantime, if the focal length of the whole system is f, and the focal length of the lens unit closest to the object is f1, and the magnification of all lens units following the object closest lens unit is $\beta q$:

$$f = f1 \cdot \beta q$$

In this case, if the front lens unit is supposed to be the decentering lens, the decenter responsiveness S can be applied to the formula 4 so that:

$$-E = \frac{f \cdot \epsilon}{\beta q} = \frac{f1 \cdot \beta q \cdot \epsilon}{\beta q} = f1 \cdot \epsilon$$

In actual practice, however, there is need to take into account the various object distances and the states of production of the various aberrations in achieving stabilization of the image. It is, therefore, preferable to approximately treat the above equation when the stabilization of the image is advantageously carried out.

In this embodiment, the various optical constants of the above-described plurality of lens units are set so that as the variable magnification optical system tilts as a whole by the angle $\epsilon$ to cause occurrence of deviation of the photographic image, when the first lens unit is parallel-decentered by about $|f1 \cdot \epsilon|$, the deviation of the image can be compensated for.

Next, conditions which are desirable where the last lens unit constituting part of a zoom lens is treated as the compensating lens unit are shown below.

That is, letting the focal length of the above-described last lens unit be denoted by fP, its paraxial lateral magnification by $\beta P$, the longest focal length of the entire lens system by fT, and the distance from the exit pupil of the entire lens system in the telephoto end to the image plane by PT, it is preferred to satisfy the following conditions:

$$0.02 < fP/fT < 10 \qquad (A6)$$

$$-10 < fT/PT < 10 \qquad (A7)$$

$$-9 < \beta p < 10 \qquad (A8)$$

When the refractive power of the last lens unit becomes too strong beyond the lower limit of the inequalities of condition (A6), objectionably large various decentering aberrations such as decentering coma and decentering astigmatism are produced.

Also, when the refractive power of the last lens unit becomes too weak beyond the upper limit, the decenter amount of the last lens unit for compensating for the deviation of the image gets large. This is no good because the sizes of the entire lens system and the drive mechanism come to increase.

When the lower limit of the inequalities of condition (A7) is exceeded, as the light ray emerging from the last lens unit focuses on the image plane, the angle of incidence of the light ray on the image plane gets large. This is no good because large decentering distortion is produced. Also, when the upper limit is exceeded, the effective diameter of the last lens unit is objectionably increased.

When the lower limit or the upper limit of the inequalities of condition (A8) is exceeded, the decenter amount of the last lens unit for compensating for the deviation of the image increases. This is no good because the lens outer diameter comes to increase.

It should be noted that the decenter amount E of the last lens unit can be expressed by the equation:

$$E = -f\epsilon/(1-\beta p)$$

where f is the overall focal length of the zoom lens and $\beta p$ is the paraxial lateral magnification of the last lens unit.

In the following, discussion is made on the basis of numerical examples of specific embodiments.

Figure 7A:
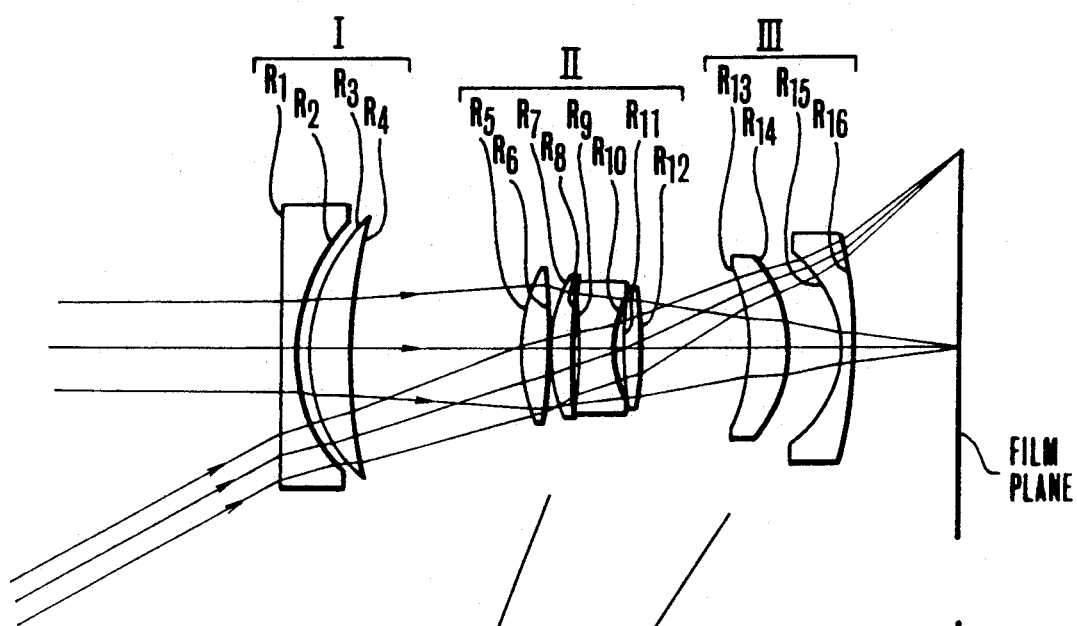
FIGS. 7(A) and 7(B) are lens block diagrams of a numerical example 1 of the variable magnification optical system of the invention.
Figure 7B:
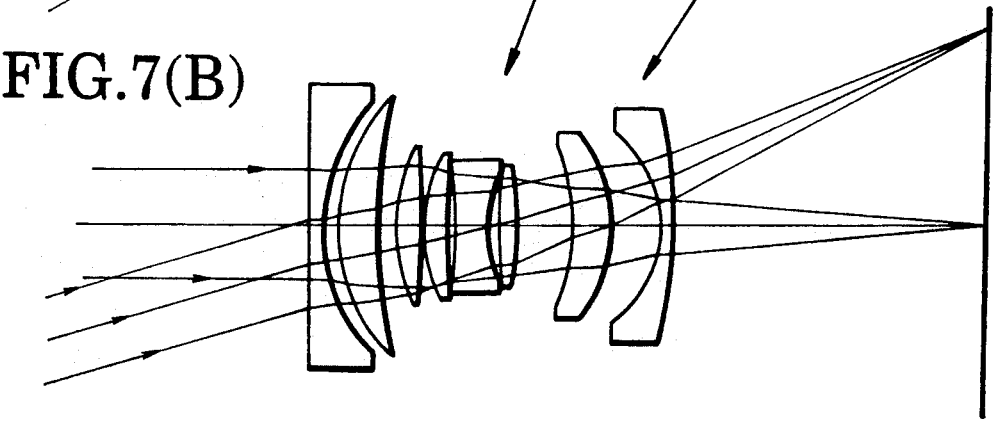

FIGS. 7(A) and 7(B) are longitudinal section views of a numerical example 1 of the variable magnification optical system of the invention with FIG. 7(A) showing the lens section in the wide angle end and FIG. 7(B) showing the lens section in the telephoto end. I is a first lens unit of negative refractive power, II is a second lens unit of positive refractive power, and III is a third lens unit of negative refractive power. The second and third lens units II and III are moved as indicated by arrows to carry out variation of the image magnification from the wide angle end to the telephoto end.

In this embodiment, if any one of the first, second and third lens units I, II and III is made to parallel-decenter, it becomes possible to compensate for the deviation of the image.

Figure 8A:
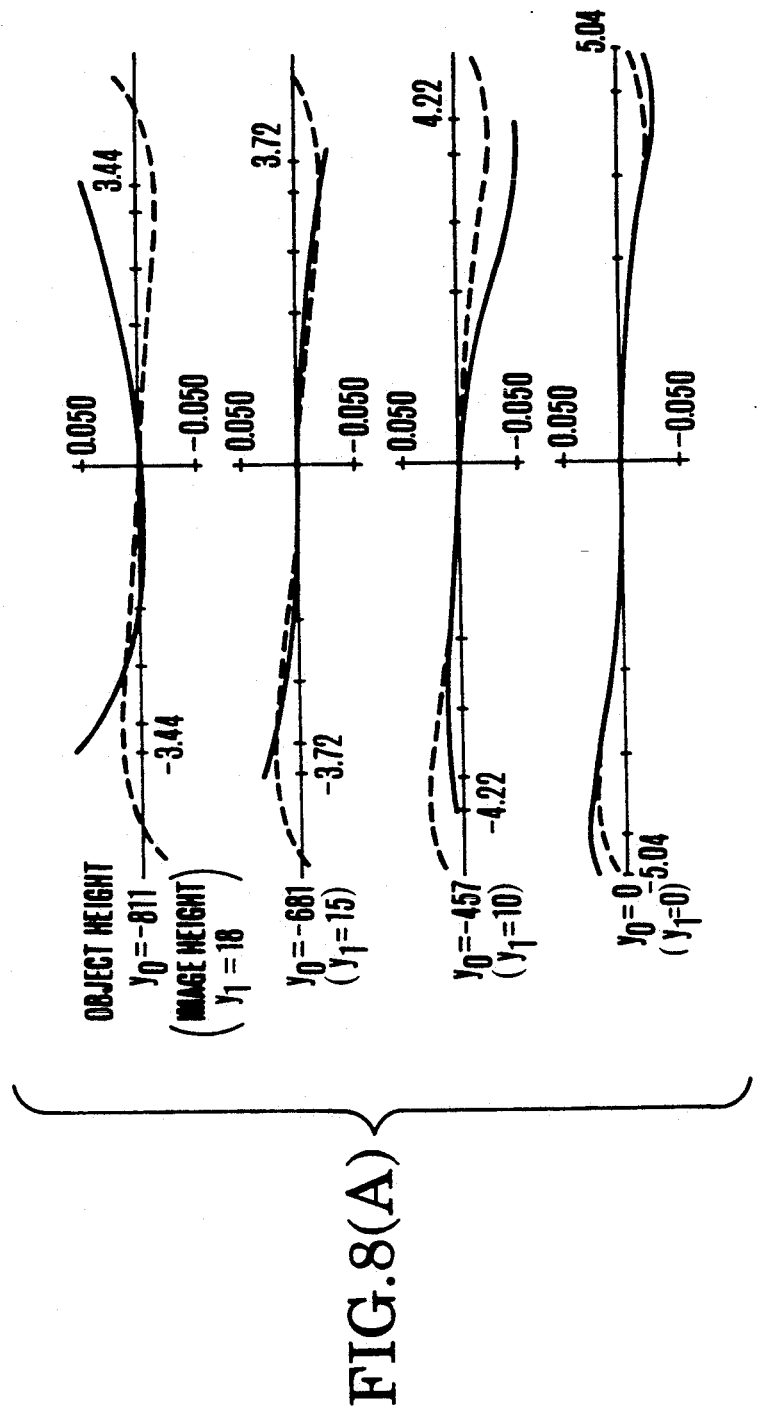
FIGS. 8(A) and 8(B) are aberration diagrams of the numerical example 1 of the invention.
Figure 8B:
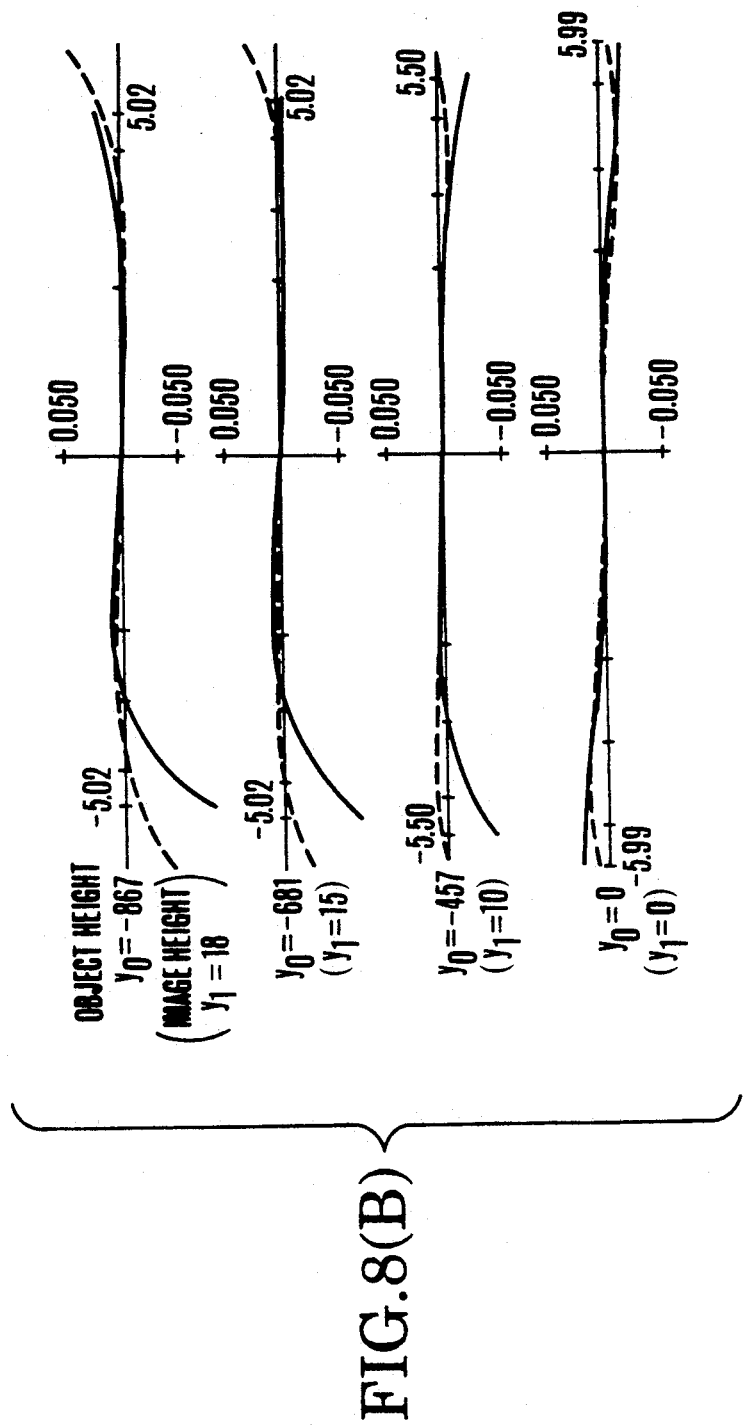

FIGS. 8(A) and 8(B) are lateral aberration curves of the numerical example 1 in the wide angle end and the telephoto end. In these figures, y₀ is the object height, and y₁ is the image height.

Figure 9A:
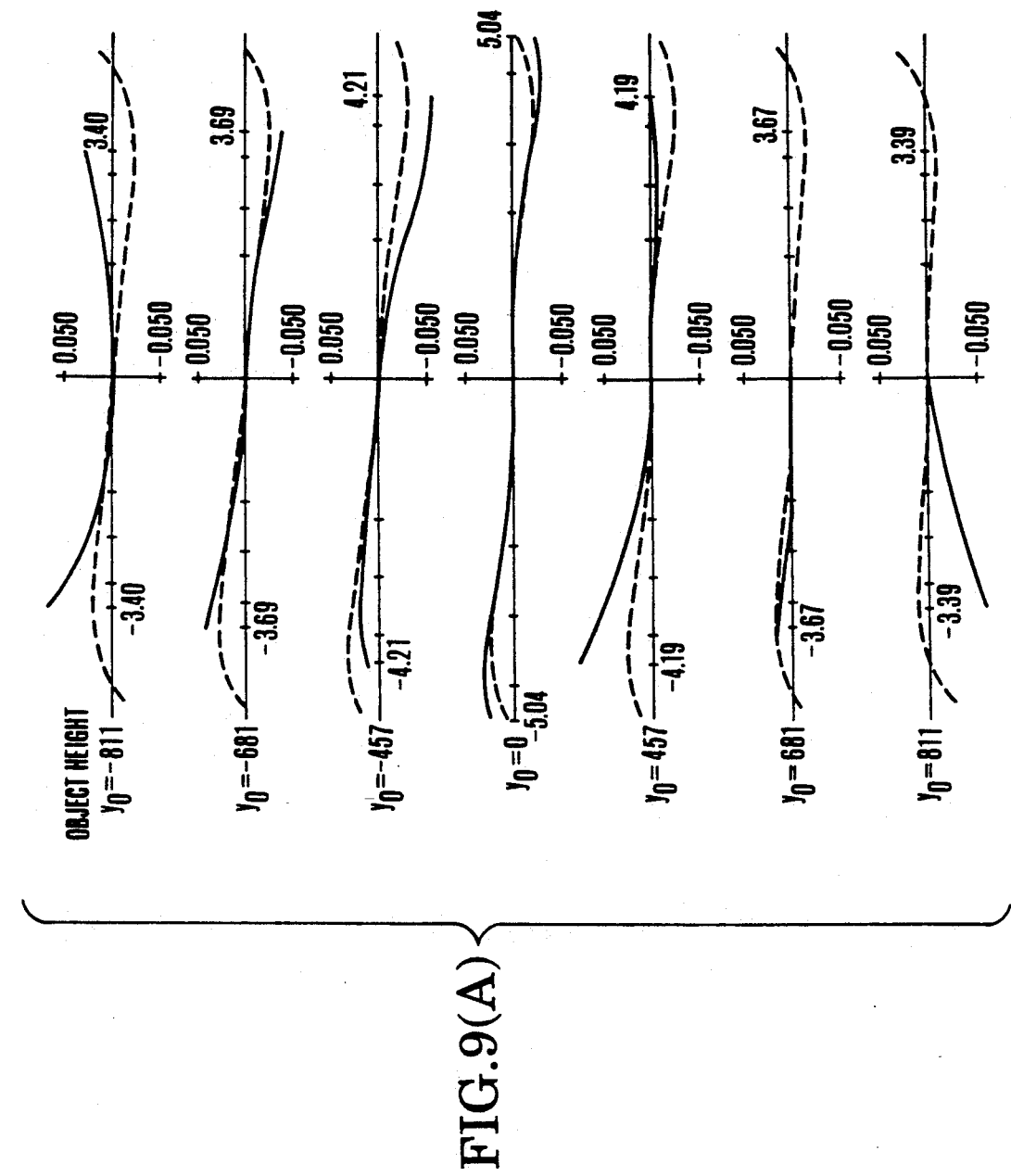
FIGS. 9(A), 9(B), 10(A), 10(B), 11(A) and 11(B) are aberration diagrams of the time when each lens unit has been decentered in the numerical example 1 of the invention.
Figure 9B:
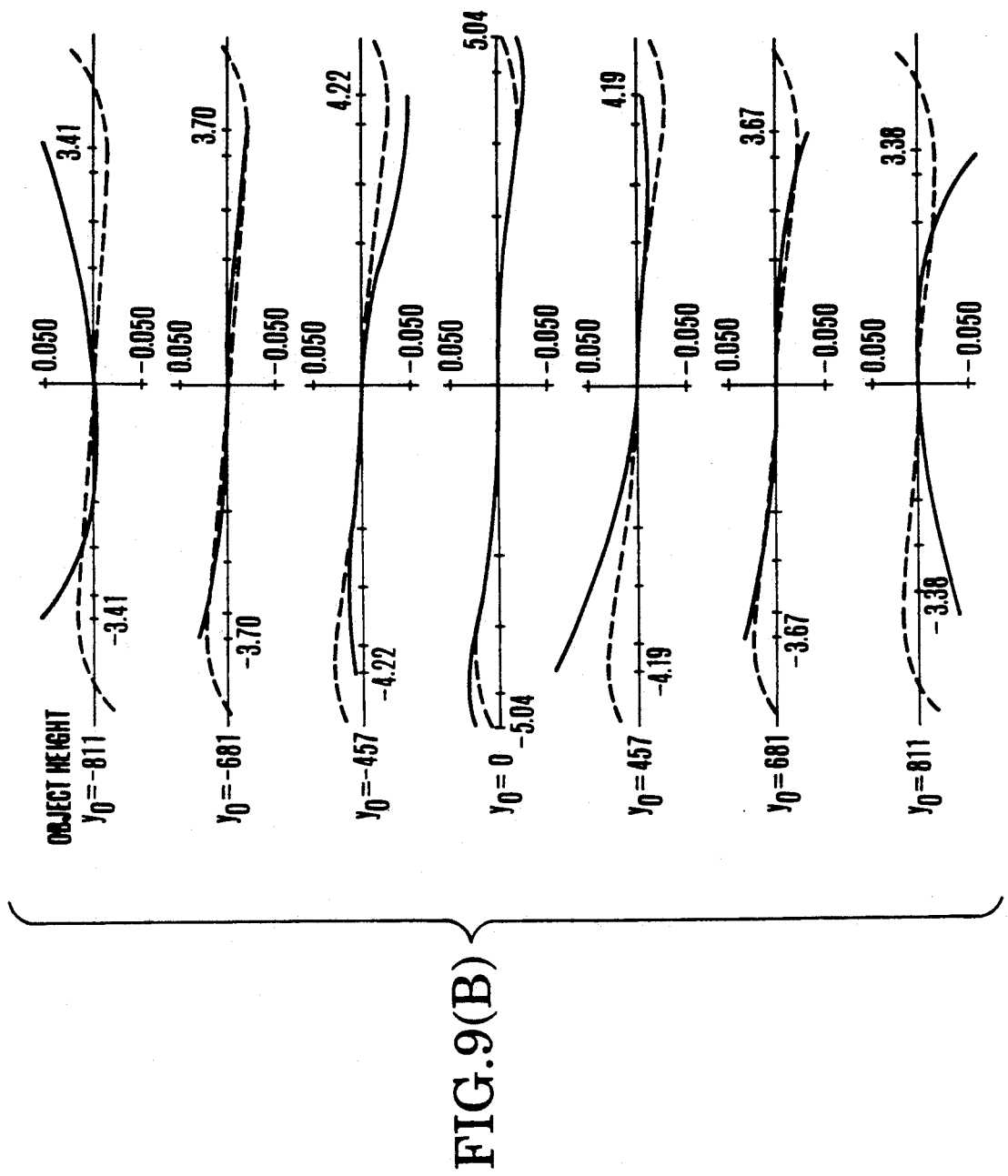
Figure 10A:
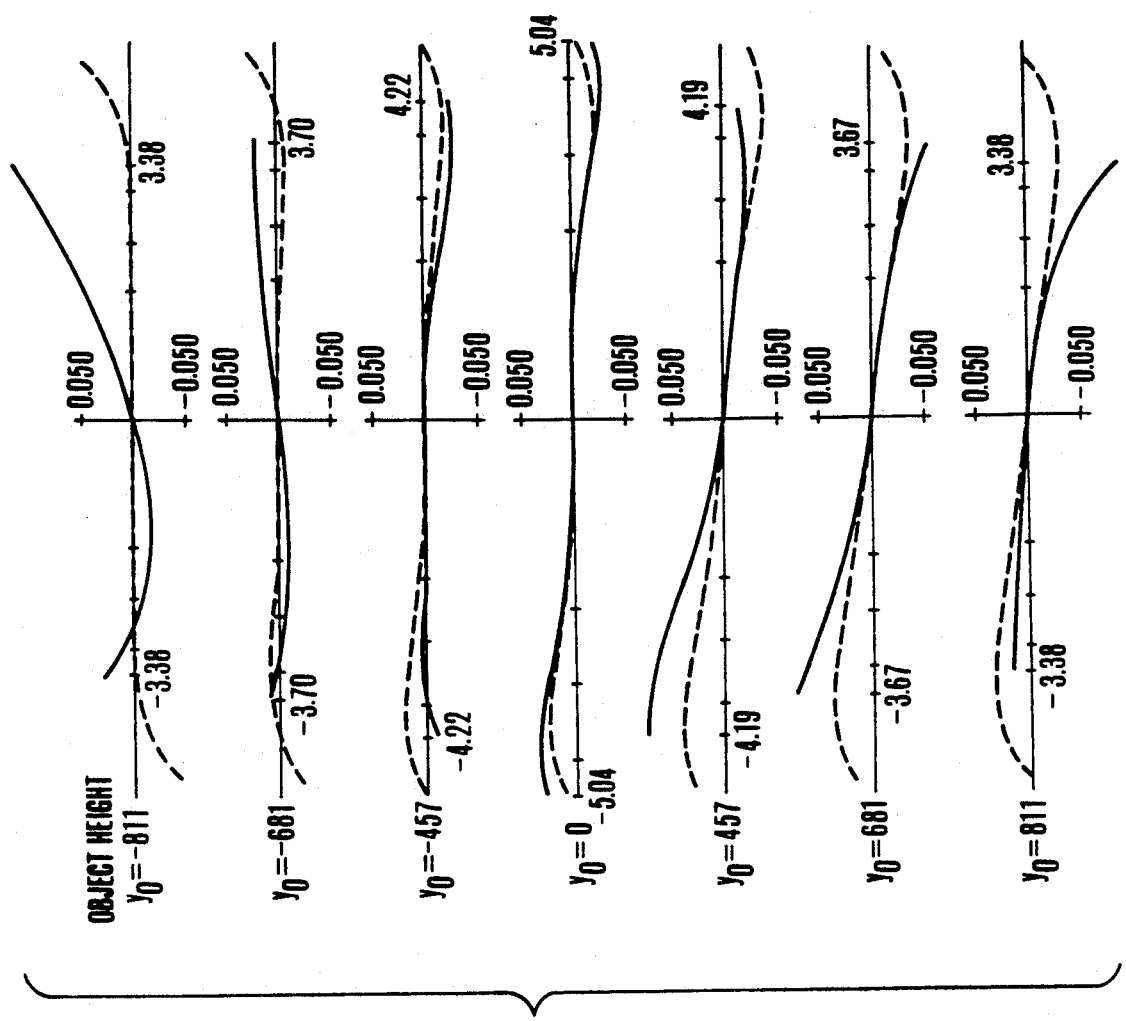
Figure 10B:
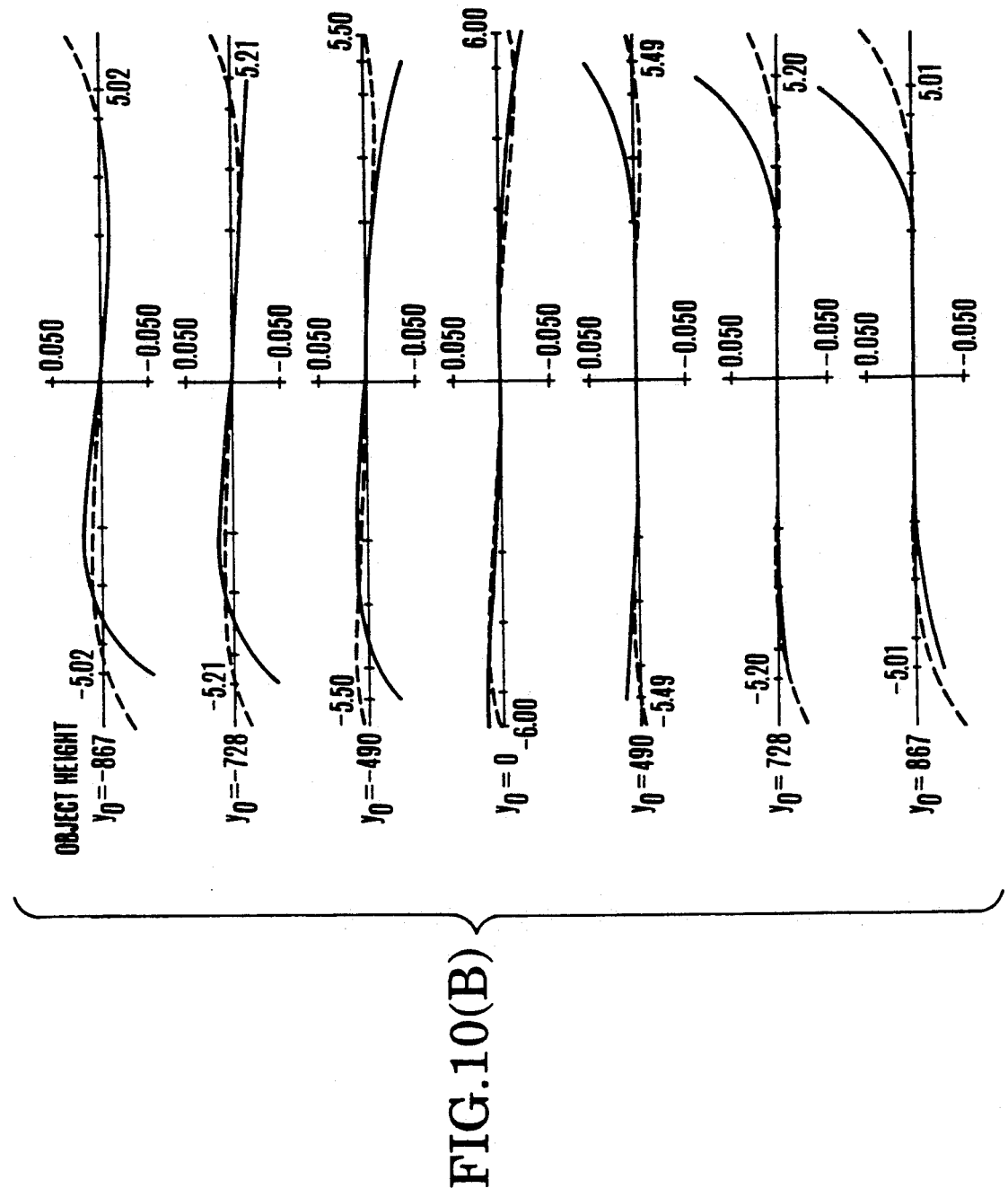
Figure 11A:
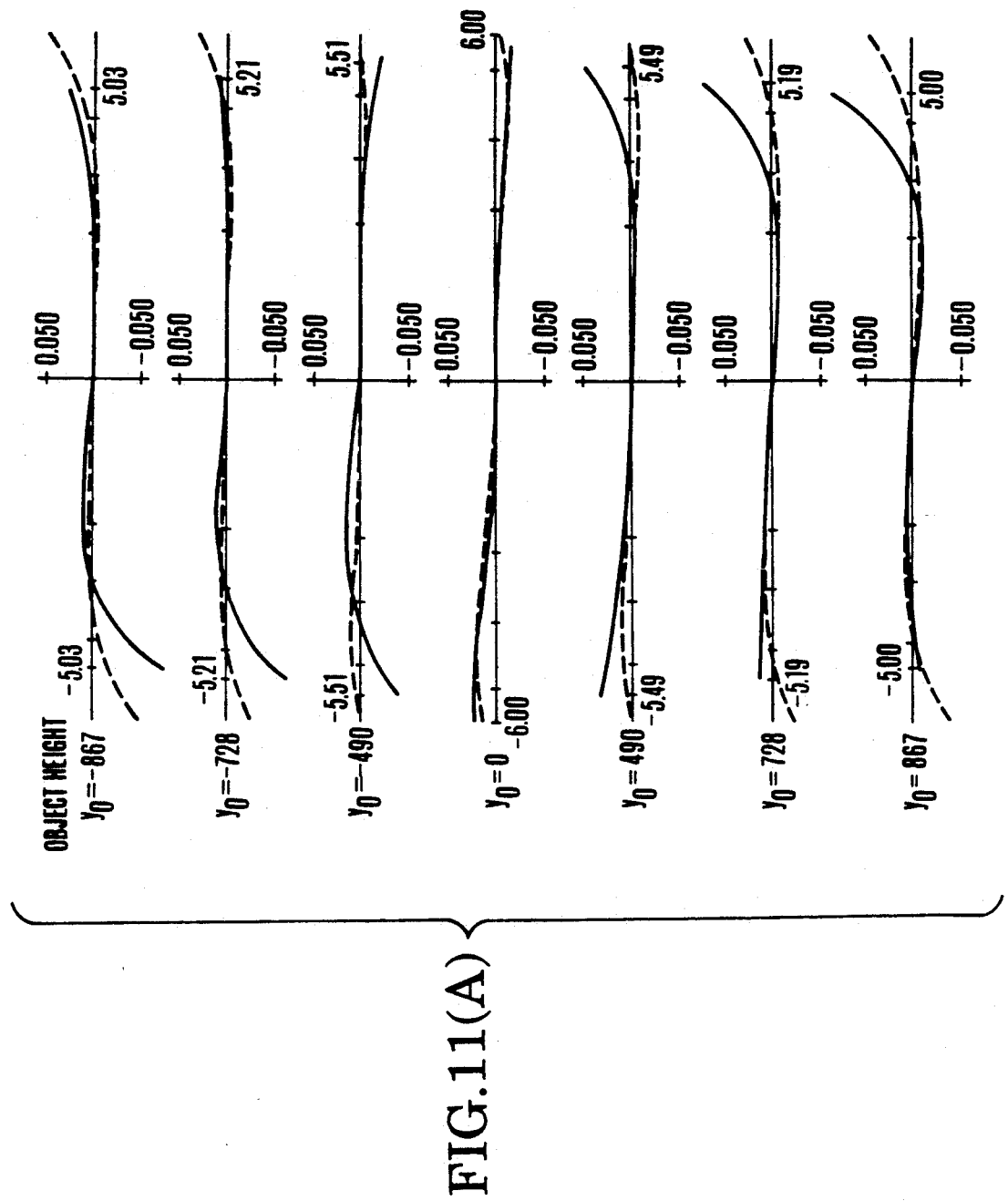
Figure 11B:
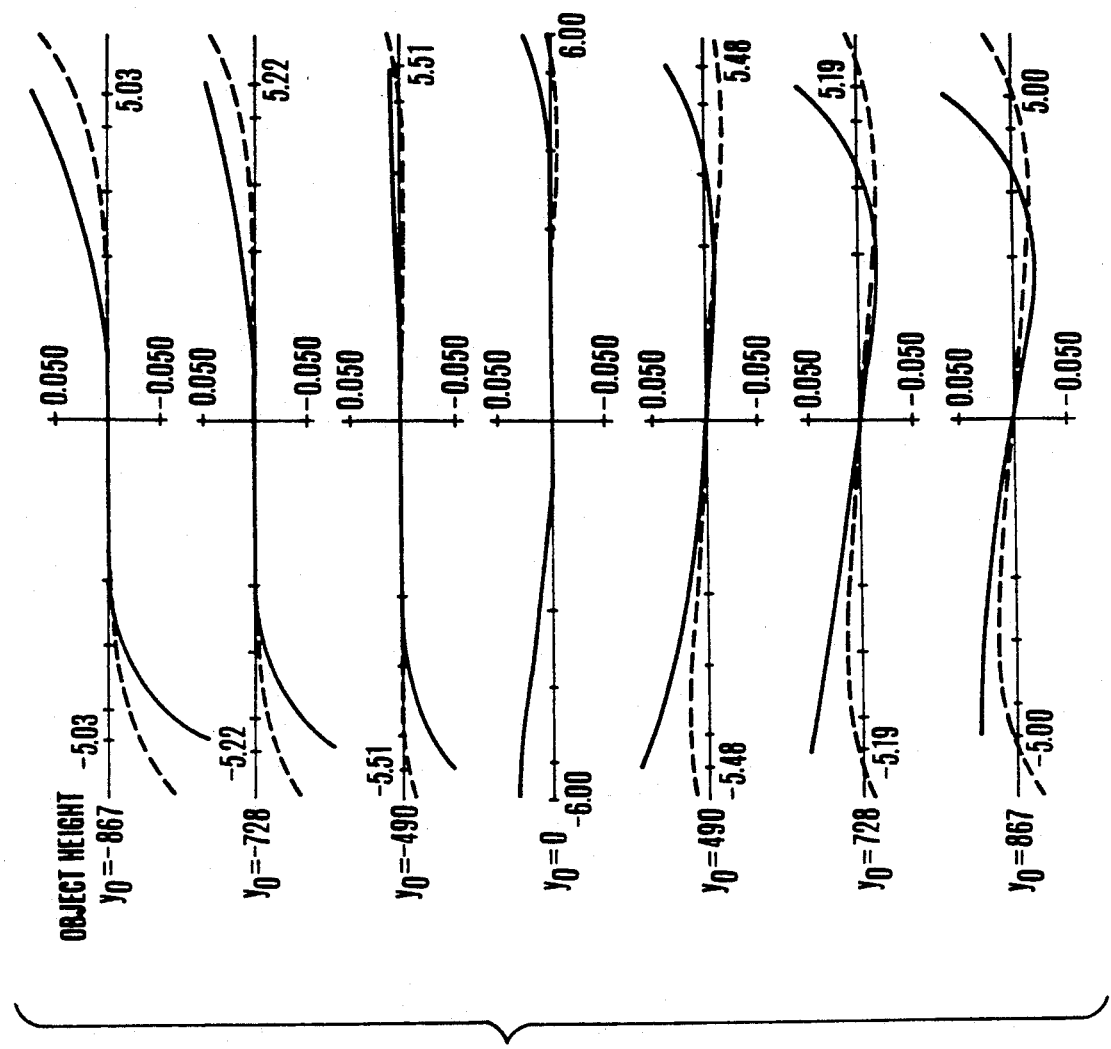

Next, in the numerical example 1, when the whole lens system is front tilted about the film plane by 9 minutes, for example, the resultant deviation of the image is compensated for by parallel-decentering either one of the first, second and third lens units by a value shown in Table-1, while the lateral aberration curves as the control examples are shown respectively in FIGS. 9(A), 9(B), FIGS. 10(A), 10(B) and FIGS. 11(A), 11(B). FIGS. 9(A), 10(A) and 11(A) are aberration curves in the wide angle end, and FIGS. 9(B), 10(B) and 11(B) are aberration curves in the telephoto end Also, in Table-2 to Table-4, the image forming position of the principal light ray on the film plane at each object height is shown to represent the state of correction of the decentering distortion when the deviation of the image is compensated for by each lens unit.

As shown in FIGS. 9(A), 9(B), 10(A), 10(B), 11(A) and 11(B) and Table-2, Table-3 and Table-4, according to this embodiment, a variable magnification optical system which is well corrected for decentering distortion while minimizing the amount of decentering aberrations produced and is compensated for the predetermined deviation of the image to have a high optical performance, is achieved by parallel-decentering the compensating lens unit.

It should be noted that in the foregoing embodiment, the case that the decentering of the compensating lens unit is made parallel to compensate for the deviation of the image has been shown, it may be made rotative, or both may be performed at the same time. Even in these cases, the object of the invention can be accomplished.

The displacement of the variable magnification optical system due to vibrations, etc. is not limited to the film center. Even if the displacement occurs about any point whatever, the invention can well apply. The lens unit for compensating for the deviation of the image is not limited to one in number, but it may be done by decentering two or more lens units independently. The compensation for the deviation of the image, instead of its being performed uniformly over the entire range of variation of the image magnification, may be made to take place only on the telephoto side where the deviation is liable to occur.

Next, a numerical example 1 of the invention is shown. In the numerical example 1, Ri is the radius of curvature of the i-th lens surface counting from the object side, Di is the i-th lens thickness and air separation counting from the object side, Ni and vi are respectively the refractive index and Abbe number of the glass of the i-th lens counting from the object side.

The aspheric surface shape is expressed in coordinates with the X-axis in the optical axis and the H-axis in a direction perpendicular to the optical axis, the direction in which light advances being taken as positive, by the equation:

$$X = \frac{(1/R)H^2}{1 + \sqrt{1-(H/R)^2}} + AH^2 + BH^4 + CH^6 + DH^8 + EH^{10}$$

where R is the radius of curvature of the paraxial region, and A, B, C, D and E are aspheric coefficients. In the following example, Ri represents the curvature of the i th lens surface counted from the object, Di represents the thickness and air space of the i th lens counting from the object, f represents the focal length of the whole system and 2ω represents the picture angle, wherein (ω) is the half image angle.

| Numerical Example 1 | | | |
|---|---|---|---|
| f = 36–68 | FNo = 3.6–5.7 | 2ω = 62°–35.3° | |
| R1 = −1370.59 | D1 = 1.700 | N1 = 1.72000 | v1 = 50.2 |
| *R2 = 20.97 | D2 = 1.522 | | |
| I  R3 = 20.05 | D3 = 3.994 | N2 = 1.68893 | v2 = 31.1 |

-continued

|     | | | | | |
|-----|---|---|---|---|---|
|     | R4 = 45.79 | D4 = Variable | | | |
|     | R5 = 20.70 | D5 = 2.779 | N3 = 1.51633 | ν3 = 64.1 | |
|     | R6 = −106.37 | D6 = 0.150 | | | |
|     | R7 = 15.74 | D7 = 2.413 | N4 = 1.51633 | ν4 = 64.1 | |
|     | R8 = 125.48 | D8 = 0.828 | | | |
| II  | R9 = −65.50 | D9 = 3.738 | N5 = 1.80518 | ν5 = 25.4 | |
|     | R10 = 15.94 | D10 = 1.089 | | | |
|     | R11 = 40.80 | D11 = 2.048 | N6 = 1.72825 | ν6 = 28.5 | |
|     | R12 = −35.29 | D12 = Variable | | | |
|     | R13 = −23.06 | D13 = 4.243 | N7 = 1.58347 | ν7 = 30.2 | |
|     | R14 = −16.59 | D14 = 5.572 | | | |
| III | R15 = −12.70 | D15 = 1.500 | N8 = 1.60311 | ν8 = 60.7 | |
|     | R16 = −55.65 | | | | |

The aspheric coefficients of the second surface $A = 0$      $B = 5.319 \times 10^{-6}$
$C = 1.919 \times 10^{-8}$   $D = -4.745 \times 10^{-13}$
$E = 1.304 \times 10^{-13}$

TABLE 1

| Zooming Position | Compensating Unit | | |
|---|---|---|---|
| | First Lens Unit--; | Second Lens Unit--; | Third Lens Unit--. |
| f = 36 | −0.18 | 0.052 | −0.31 |
| f = 68 | −0.18 | 0.063 | −0.215 |

TABLE 2

Compensation by First Lens Unit

| | Height of Principal Ray on Image Plane | | | | | |
|---|---|---|---|---|---|---|
| Object Height | (a) No Vibratory State | (b) Deviated State | (c) Deviation Compensated State | (d) Image Deviation Amount (b) − (a) | (e) Image Deviation Compensated Amount (c) − (b) | (f) Residual Image Deviation Amount (d) + (e) = (c) − (a) |
| Wide Angle End (f = 36) | | | | | | |
| −965.49 | 21.62 | 21.47 | 21.68 | −0.14 | 0.20 | 0.05 |
| −811.37 | 17.99 | 17.86 | 18.03 | −0.12 | 0.16 | 0.03 |
| −680.55 | 14.99 | 14.87 | 15.01 | −0.12 | 0.14 | 0.02 |
| −457.44 | 9.99 | 9.88 | 10.00 | −0.10 | 0.11 | 0.00 |
| 0 | 0 | −0.10 | −0.004 | −0.099 | 0.09 | 0.00 |
| 7.44 | −9.99 | −10.10 | −9.98 | −0.10 | 0.11 | 0.00 |
| 0.55 | −14.99 | −15.11 | −14.97 | −0.12 | 0.14 | 0.02 |
| 1.37 | −17.99 | −18.12 | −17.96 | −0.12 | 0.16 | 0.03 |
| 5.49 | −21.62 | −21.76 | −21.56 | −0.14 | 0.20 | 0.06 |
| Telephoto End (f = 68) | | | | | | |
| −1030.42 | 21.62 | 21.39 | 21.63 | −0.22 | 0.23 | 0.01 |
| −866.63 | 17.99 | 17.77 | 17.99 | −0.21 | 0.21 | 0.00 |
| −727.74 | 14.99 | 14.79 | 14.99 | −0.20 | 0.20 | 0.00 |
| −489.99 | 9.99 | 9.80 | 9.99 | −0.19 | 0.19 | 0.00 |
| 0 | 0 | −0.18 | 0.00 | −0.18 | 0.18 | 0.00 |
| 9.99 | −9.99 | −10.19 | −9.99 | −0.19 | 0.19 | 0.00 |
| 7.74 | −14.99 | −15.19 | −14.99 | −0.20 | 0.20 | 0.00 |
| 6.63 | −17.99 | −18.20 | −17.98 | −0.21 | 0.22 | 0.00 |
| 0.42 | −21.62 | −21.84 | −21.60 | −0.22 | 0.23 | 0.01 |

TABLE 3

Compensation by Second Lens Unit

| | Height of Principal Ray on Image Plane | | | | | |
|---|---|---|---|---|---|---|
| Object Height | (a) No Vibratory State | (b) Deviated State | (c) Deviation Compensated State | (d) Image Deviation Amount (b) − (a) | (e) Image Deviation Compensated Amount (c) − (b) | (f) Residual Image Deviation Amount (d) + (e) = (c) − (a) |
| Wide Angle End (f = 36) | | | | | | |
| −965.49 | 21.62 | 21.47 | 21.64 | −0.14 | 0.16 | 0.01 |
| −811.37 | 17.99 | 17.86 | 18.00 | −0.12 | 0.14 | 0.01 |
| −680.55 | 14.99 | 14.87 | 15.00 | −0.12 | 0.12 | 0.00 |
| −457.44 | 9.99 | 9.88 | 9.99 | −0.10 | 0.10 | 0.00 |
| 0 | 0 | −0.09 | 0.00 | −0.09 | 0.09 | 0.00 |
| 7.44 | −9.99 | −10.10 | −9.99 | −0.10 | 0.10 | 0.00 |
| 0.55 | −14.99 | −15.11 | −14.99 | −0.12 | 0.12 | 0.00 |
| 1.37 | −17.99 | −18.12 | −17.98 | −0.12 | 0.14 | 0.01 |
| 5.49 | −21.62 | −21.76 | −21.60 | −0.14 | 0.16 | 0.01 |
| Telephoto End (f = 68) | | | | | | |

TABLE 3-continued

Compensation by Second Lens Unit

| | Height of Principal Ray on Image Plane | | | | | |
|---|---|---|---|---|---|---|
| Object Height | (a) No Vibratory State | (b) Deviated State | (c) Deviation Compensated State | (d) Image Deviation Amount (b) − (a) | (e) Image Deviation Compensated Amount (c) − (b) | (f) Residual Image Deviation Amount (d) + (e) = (c) − (a) |
| −1030.42 | 21.62 | 21.39 | 21.61 | −0.22 | 0.21 | 0.00 |
| −866.63 | 17.99 | 17.77 | 17.98 | −0.21 | 0.20 | 0.00 |
| −727.74 | 14.99 | 14.79 | 14.98 | −0.20 | 0.19 | 0.00 |
| −489.99 | 9.99 | 9.80 | 9.99 | −0.19 | 0.18 | 0.00 |
| 0 | 0 | −0.18 | 0.00 | −0.18 | 0.18 | 0.00 |
| 89.99 | −9.99 | −10.19 | −10.00 | −0.19 | 0.18 | 0.00 |
| 27.74 | −14.99 | −15.19 | −15.00 | −0.20 | 0.19 | 0.00 |
| 66.63 | −17.99 | −18.20 | −17.99 | −0.21 | 0.20 | 0.00 |
| 30.42 | −21.62 | −21.84 | −21.62 | −0.22 | 0.21 | 0.00 |

TABLE 3

Compensation by Third Lens Unit

| | Height of Principal Ray on Image Plane | | | | | |
|---|---|---|---|---|---|---|
| Object Height | (a) No Vibratory State | (b) Deviated State | (c) Deviation Compensated State | (d) Image Deviation Amount (b) − (a) | (e) Image Deviation Compensated Amount (c) − (b) | (f) Residual Image Deviation Amount (d) + (e) = (c) − (a) |
| Wide Angle End (f = 36) | | | | | | |
| −965.49 | 21.62 | 21.47 | 21.77 | −0.14 | 0.29 | 0.15 |
| −811.37 | 17.99 | 17.86 | 18.10 | −0.12 | 0.24 | 0.11 |
| −680.55 | 14.99 | 14.87 | 15.07 | −0.12 | 0.19 | 0.07 |
| −457.44 | 9.99 | 9.88 | 10.02 | −0.10 | 0.13 | 0.02 |
| 0 | 0 | −0.09 | 0.00 | −0.09 | 0.09 | 0.00 |
| 57.44 | −9.99 | −10.10 | −9.97 | −0.10 | 0.13 | 0.02 |
| 80.55 | −14.99 | −15.11 | −14.97 | −0.12 | 0.18 | 0.06 |
| 11.37 | −17.99 | −18.12 | −17.89 | −0.12 | 0.23 | 0.10 |
| 65.49 | −21.62 | −21.76 | −21.47 | −0.14 | 0.29 | 0.14 |
| Telephoto End (f = 68) | | | | | | |
| −1030.42 | 21.62 | 21.39 | 21.64 | −0.22 | 0.24 | 0.01 |
| −866.63 | 17.99 | 17.77 | 18.00 | −0.21 | 0.22 | 0.01 |
| −727.74 | 14.99 | 14.79 | 15.00 | −0.20 | 0.21 | 0.00 |
| −489.99 | 9.99 | 9.80 | 9.99 | −0.19 | 0.19 | 0.00 |
| 0 | 0 | −0.18 | 0.00 | −0.18 | 0.18 | 0.00 |
| 489.99 | −9.99 | −10.19 | −9.99 | −0.19 | 0.19 | 0.00 |
| 727.74 | −14.99 | −15.19 | −14.98 | −0.20 | 0.20 | 0.00 |
| 866.63 | −17.99 | −18.20 | −17.98 | −0.21 | 0.22 | 0.00 |
| 030.42 | −21.62 | −21.84 | −21.60 | −0.22 | 0.23 | 0.01 |

Next, concerning the case where the last lens unit of the zoom lens system is treated as the compensating lens unit, inequalities of conditions for, while minimizing the size of the compensating lens unit, as far suppressing the various aberrations and particularly those various aberrations which are produced when decentering as possible are described below.

That is to maintain good optical performance when the third lens unit is decentered to compensate for the deviation of the image and to construct the third lens unit from at least a first lens of convex shape toward the image side, a second lens of concave shape toward the object side and a positive third lens in this order from the front, it is good to satisfy the following condition:

$$-0.4 < R_{3-2}/R_{3-1} < 0.4 \quad (B1)$$

$$-0.7 < R_{3-2}/fw < -0.1 \quad (B2)$$

$$-0.7 < R_{3-3}/fw < 0.1 \quad (B3)$$

$$-0.5 < R_{3-3}/R_{3-4} < 0 \quad (B4)$$

where $R_{3-i}$ is the radius of curvature of the i-th surface counting from the object side of the third lens unit, and fw the focal length of the entire lens system in the zoom position of the wide angle end.

The inequalities of condition (B1) concern with the lens shape of the first lens. When the curvature of the lens surface of the object side becomes strong beyond the lower limit, the astigmatism on the telephoto side gets harder to correct well. Also, the decentering astigmatism on the telephoto side comes to increase. Conversely when the lens surface of the image side becomes to turn the strong convex surface beyond the upper limit toward the image side, large higher order spherical aberrations are produced on the telephoto side and the wide angle side, and also higher order coma on the telephoto side is increased objectionably.

The inequalities of conditions (B2) and (B3) concern with an air lens formed by the first lens and the second lens. When the curvature of each lens surface becomes weak beyond the lower limits of the inequalities of conditions (B2) and (B3), the astigmatism on the telephoto side gets larger, and large decentering astigmatism comes to produce. Conversely when the upper limit is exceeded, flare owing to the higher order aberrations increases objectionably.

The inequalities of condition (B4) concern with the lens shape of the negative second lens and have an aim to well correct mainly the decentering distortion on the wide angle side. When the lower limit is exceeded, large positive distortion is produced in the lens surface of the image side. So it becomes difficult to minimize the decentering distortion. Conversely when the upper limit is exceeded, the curvature of the lens surface of the object side becomes strong, and the higher order decentering coma becomes difficult to correct well.

In this embodiment, to maintain good image plane characteristics by minimizing the Petzval sum produced from the third lens unit, it is good to satisfy the following condition:

$$\overline{NN}-\overline{NP}<0.15 \quad (B5)$$

where $\overline{NP}$ is the mean refractive index of the materials of the first lens and the third lens, and $\overline{NN}$ is the refractive index of the material of the second lens. For example, the mean refractive index of the lens unit having the refractive indices of N1=1.6, N2=1.5, and N3=1.4 will be calculated as:

$$\frac{1.6 + 1.5 + 1.4}{3} = 1.5$$

or a value of 1.5.

When the inequality of condition (B5) is violated, the decentering curvature of field becomes large. This is no good because the so-called one-sided defocusing is liable to occur.

Also, in this embodiment, to compensate for the deviation of the image advantageously while achieving minimization of the size of the whole lens system of the third lens unit, it is good to satisfy the following condition:

$$-1.8<fw/f3<-0.5 \quad (B6)$$

where f3 is the overall focal length of the third lens unit, and fw is the focal length of the entire lens system in the zooming position of the wide angle end.

When the focal length of the third lens unit becomes too short beyond the lower limit of the inequalities of condition (B6), the total length of the lens becomes short, but the various aberrations increase largely, and it becomes difficult to well correct these aberrations. Also, when the focal length becomes longer beyond the upper limit, the amount of movement in accompaniment with the decentering increases too much. In other words, beyond the lower limit of the formula 6, the focal length of the third lens unit becomes shorter. This is no good because the size of the entire lens system comes to increase.

It should be noted that in this embodiment to further improve the correction of the decentering aberrations which are produced when the third lens unit is made to parallel-decenter to compensate for the deviation of the image, it is good to apply an aspheric surface to at least one of the convex surface of the image side of the first lens and the concave surface of the object side of the third lens.

The aspheric surface shape of this time in expression of the following equation taking X-axis in the axial direction, H-axis in a direction perpendicular to the optical axis, and the direction in which light advances as positive, $$X = \frac{(1/R)H^2}{1 + \sqrt{1-(H/R)^2}} + AH^2 + BH^4 + CH^6 + DH^8 + EH^{10}$$

where R is the radius of curvature of the paraxial region and A, B, C, D and E are the aspheric coefficients, when applied to the convex surface of the first lens, satisfies the following conditions:

$$-7\times10^{-5}<B<-2\times10^{-5} \quad (B7)$$

$$1\times10^{-7}<C<8\times10^{-7} \quad (B8)$$

The formula (B7) shows the non-spherical coefficient of the first lens of the third lens unit, while the formula (B10) hereafter, shows the non-spherical coefficient of a lens of the first lens unit.

Also, when applied to the concave surface of the third lens, it is good to satisfy the following condition:

$$6\times10^{-6}<B<8\times10^{-5} \quad (B9)$$

The inequalities of conditions (B7) and (B8) have a main aim to correct the tertiary aberrations and higher order aberrations in good balance. When the lower limits of the inequalities of conditions (B7) and (B8) are exceeded, the tertiary spherical aberration becomes under-corrected. When the upper limits are exceeded, the tertiary spherical aberration conversely becomes over-corrected. Thus, the tertiary aberrations and the higher order aberrations become difficult to correct in good balance.

The inequalities of condition (B9) have a main aim to well correct the decentering coma on the telephoto side. When the lower limit of the inequalities of condition (B9) is exceeded, the negative decentering coma increases. When the upper limit is exceeded, the higher order decentering coma produced on the telephoto side increases objectionably.

Beside this, in this embodiment, to correct the aberrations of the normal state of the entire lens system in good balance, particularly to well correct the off-axis aberrations, it is good to apply that aspheric surface which satisfies the following condition to the lens surface of positive refracting power in the first lens unit which has a large height $|\bar{h}|$ of incidence of the light ray on the lens surface.

That is, when the aspheric surface shape is expressed as has been described before, it is to satisfy the condition:

$$-2\times10^{-5}<B<0 \quad (B10)$$

Figure 12:
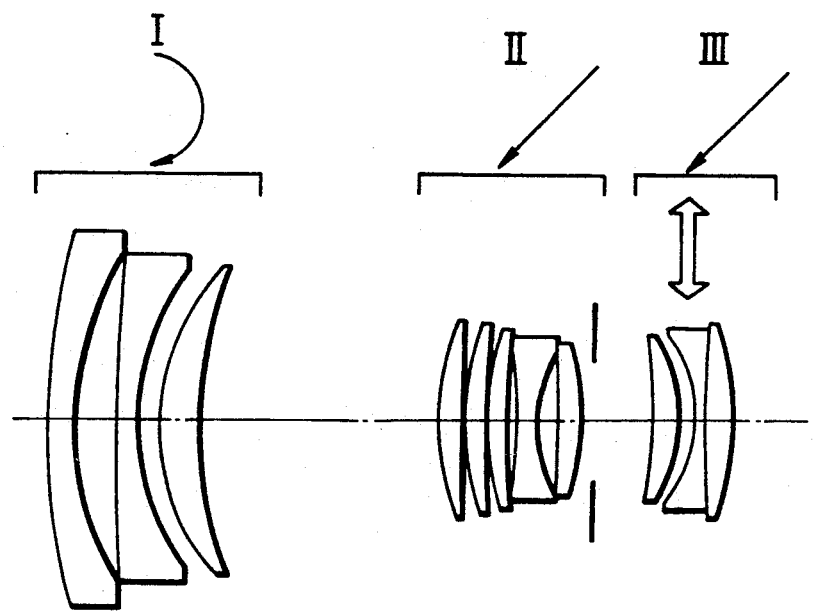
FIGS. 12-14 are lens block diagrams of numerical examples 2-4 of the variable magnification optical system according to the invention respectively.
Figure 13:
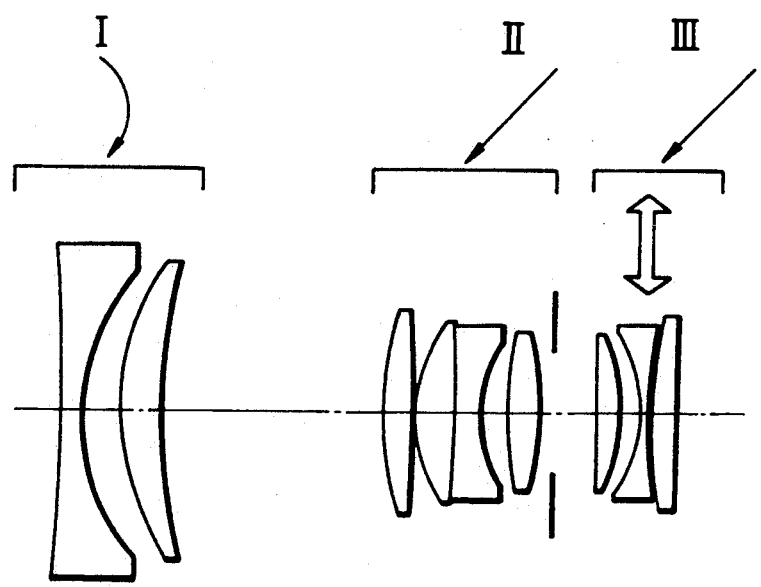
Figure 14:
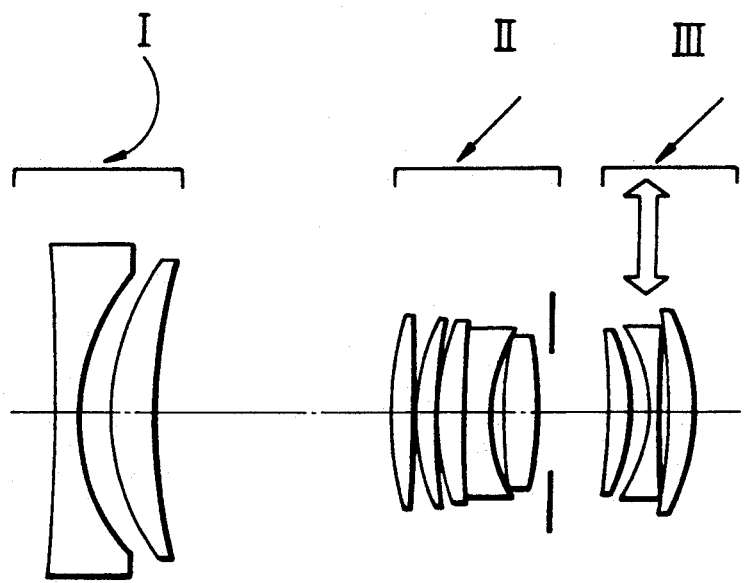
Figure 15A:
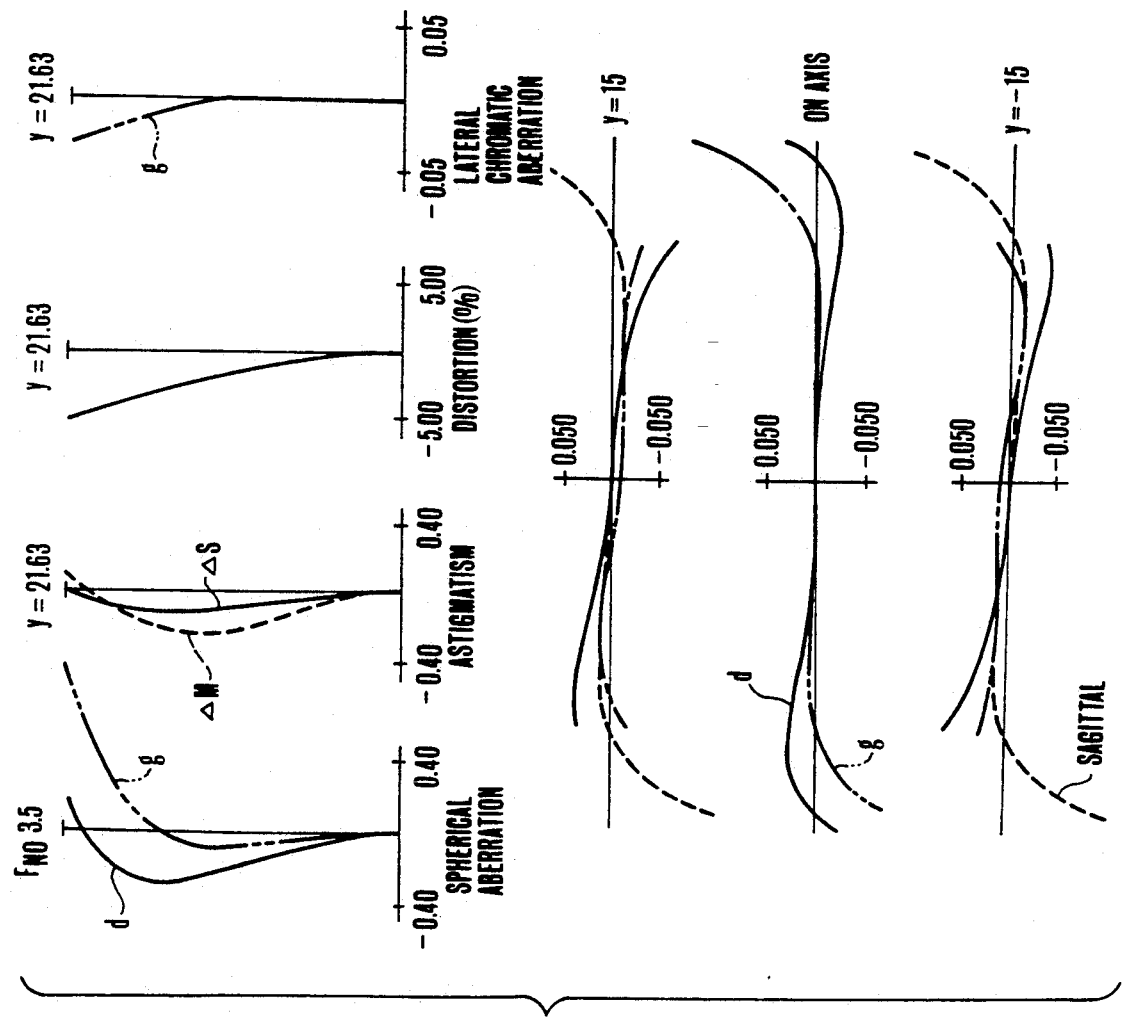
Figure 15B:
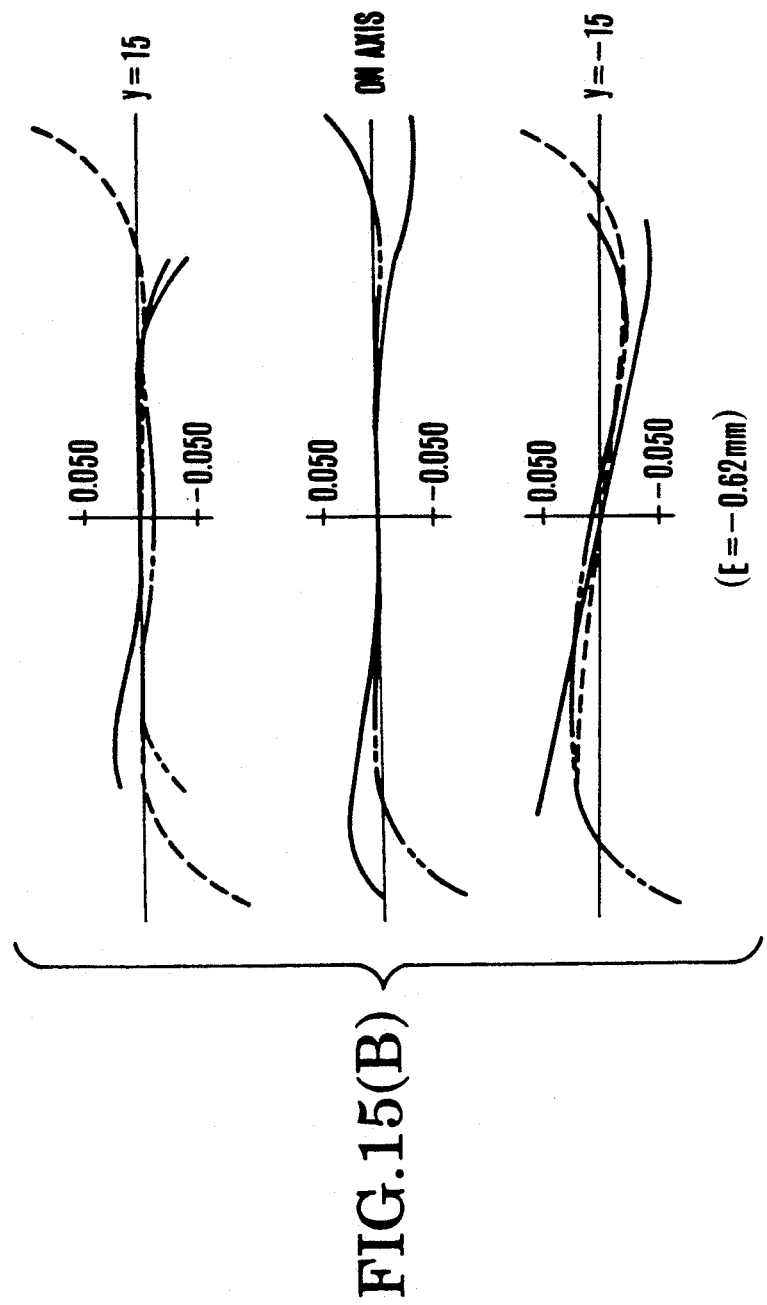
Figure 15C:
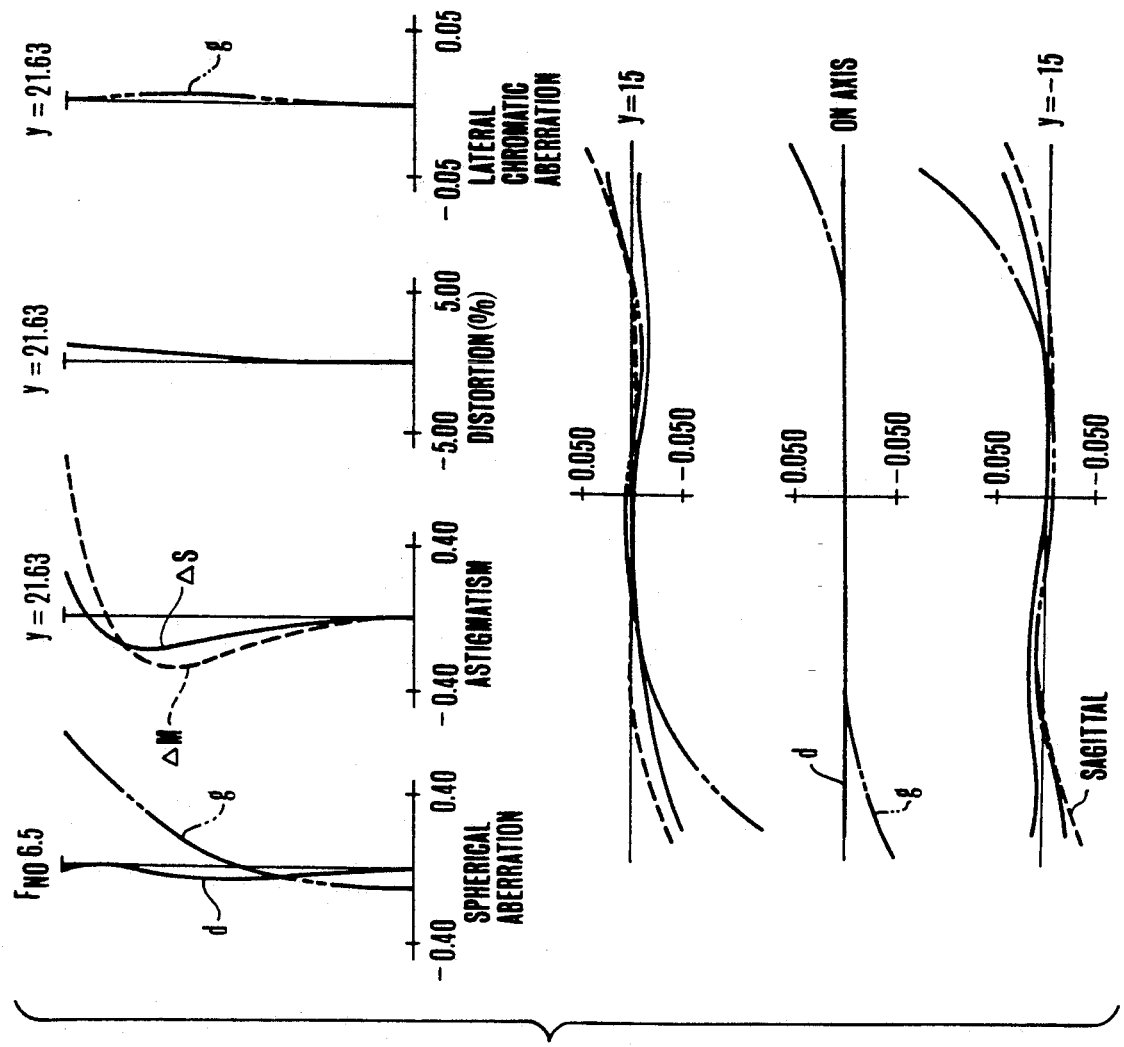
Figure 15D:
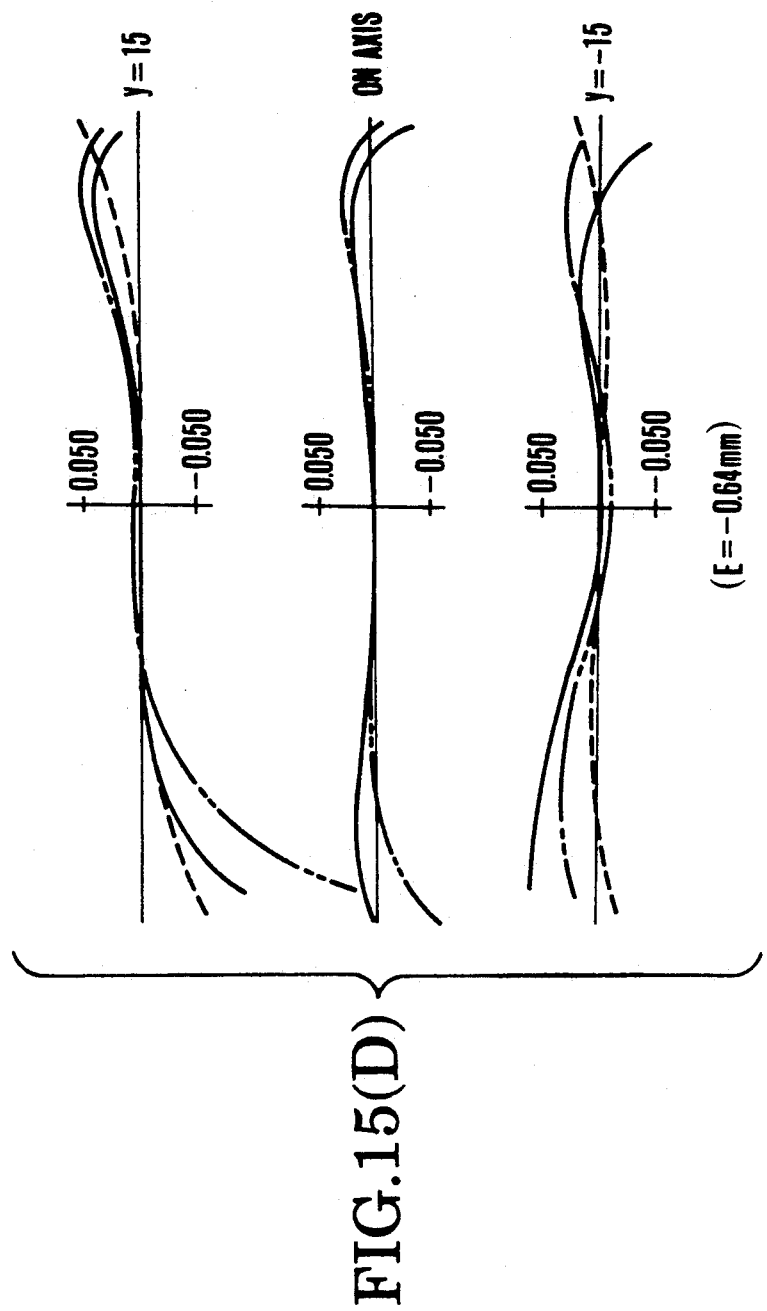
Figure 16A:
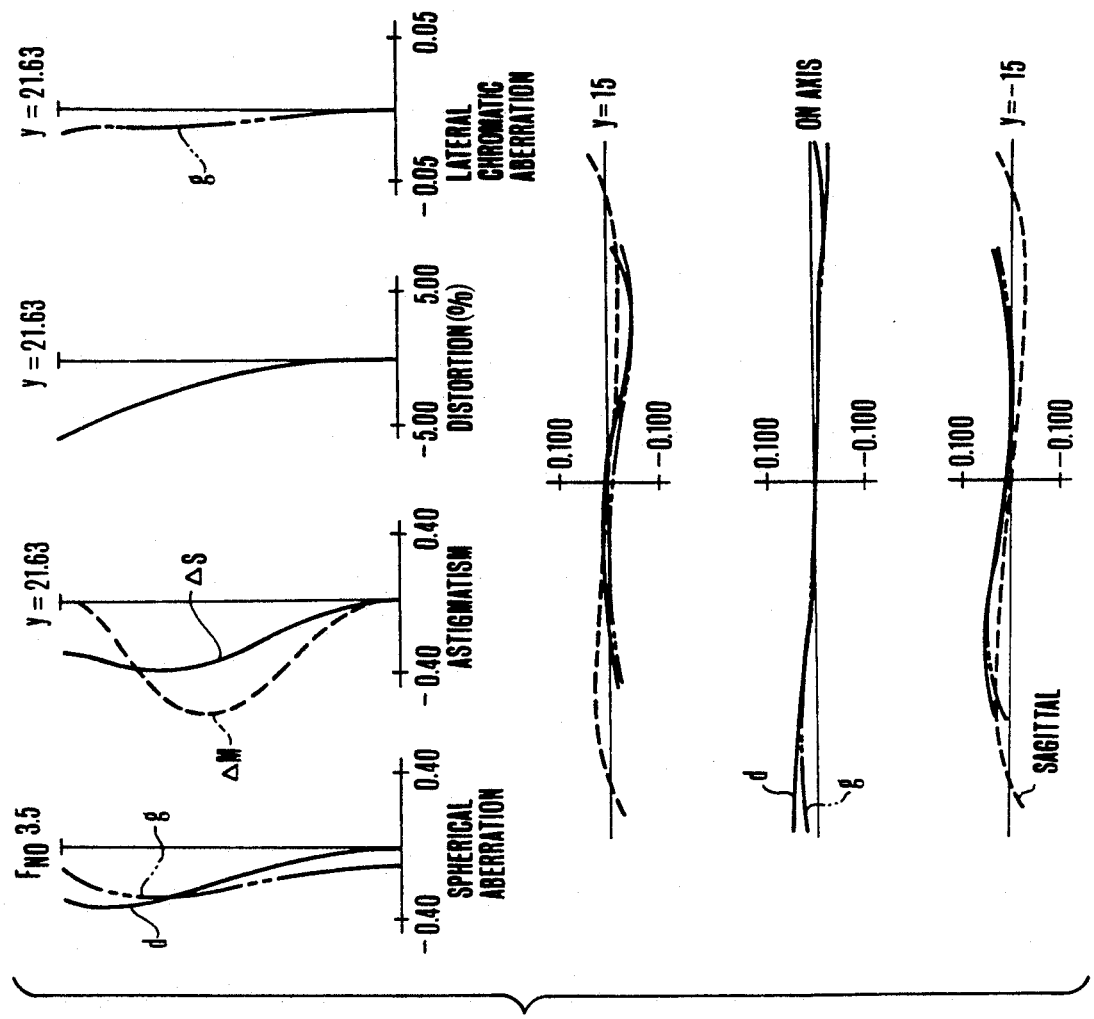
Figure 16B:
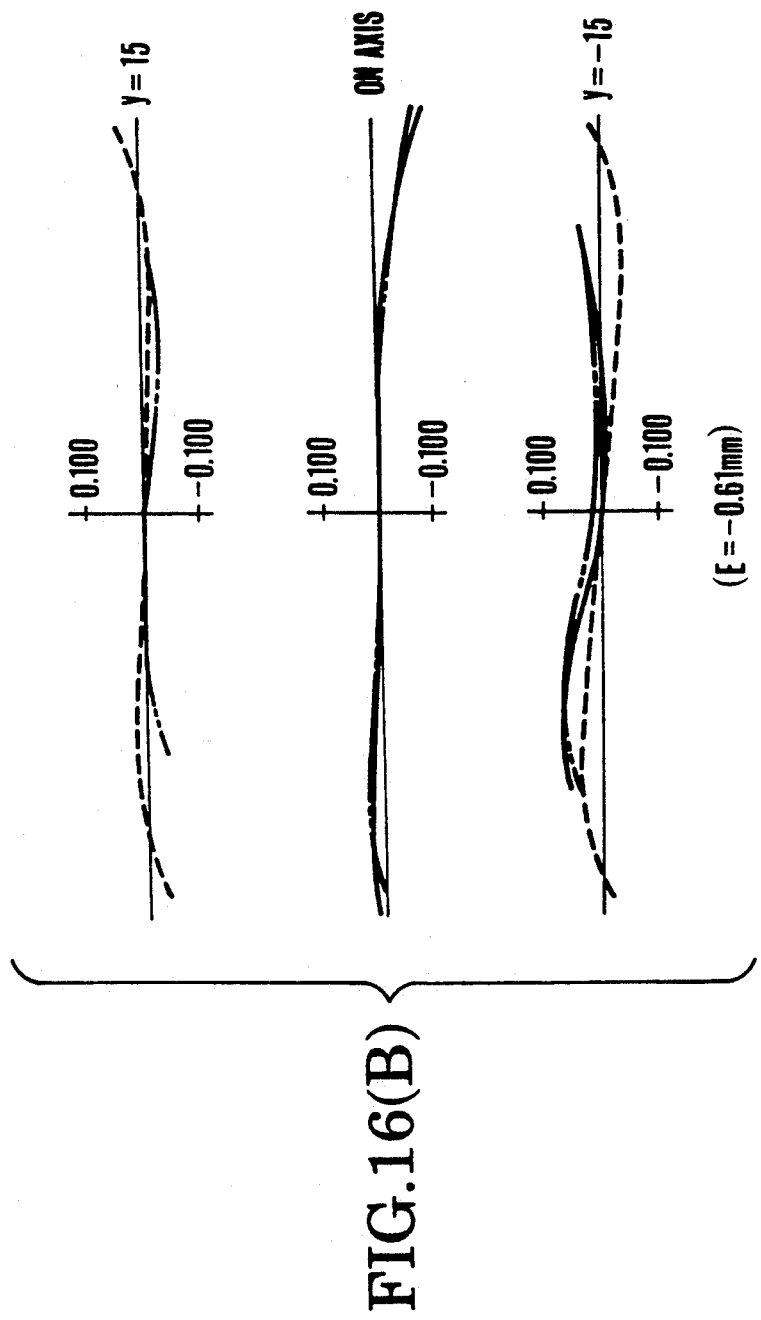
Figure 16C:
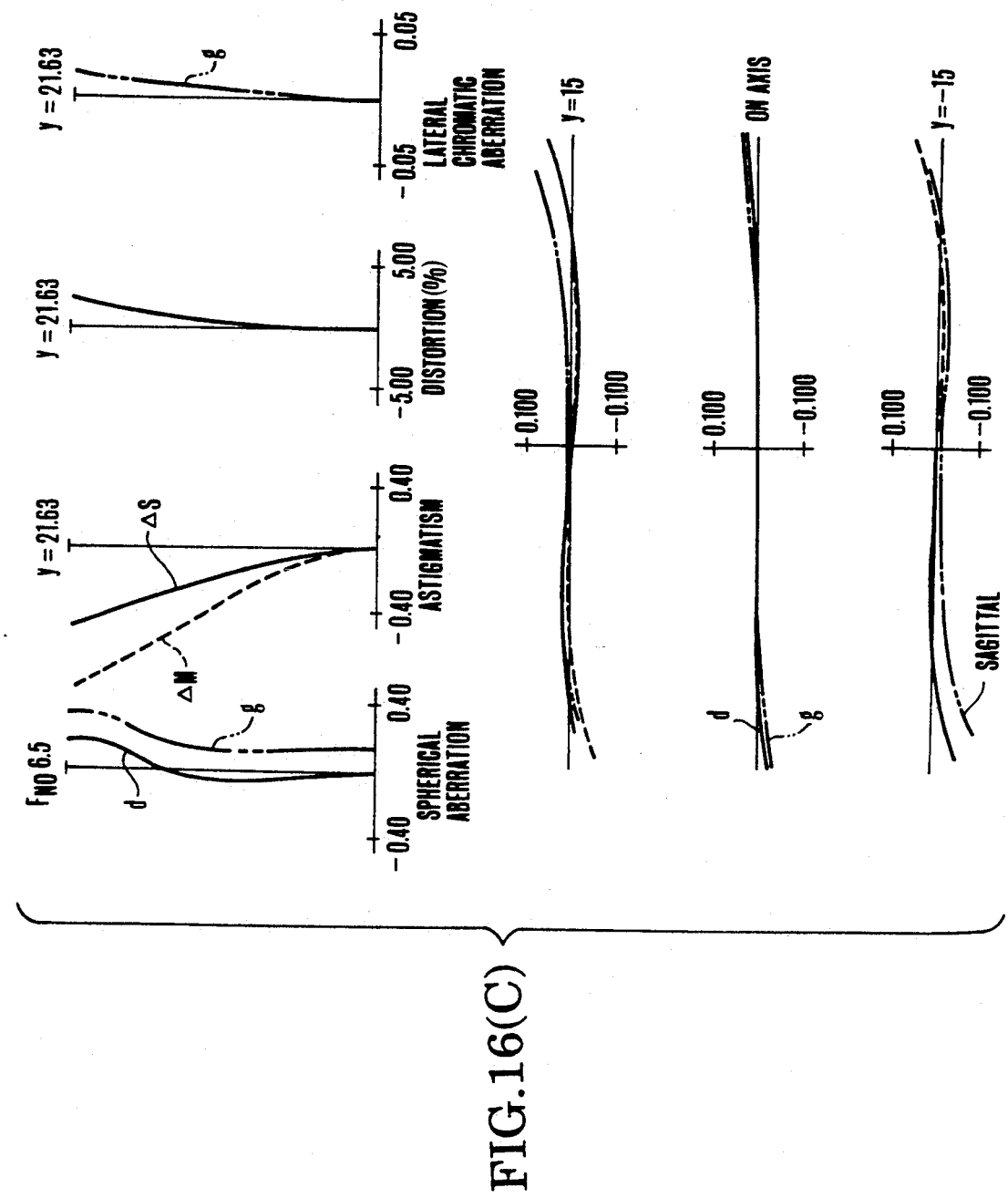
Figure 16D:
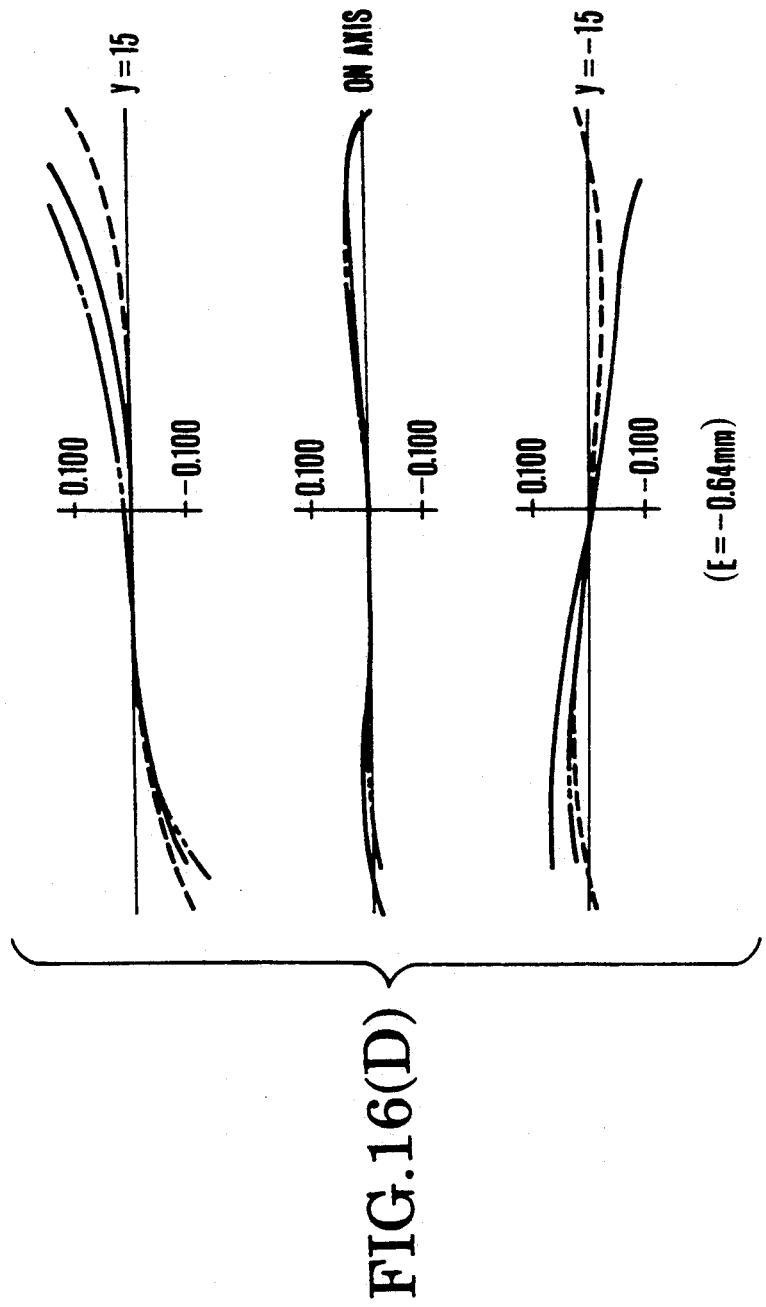
Figure 17A:
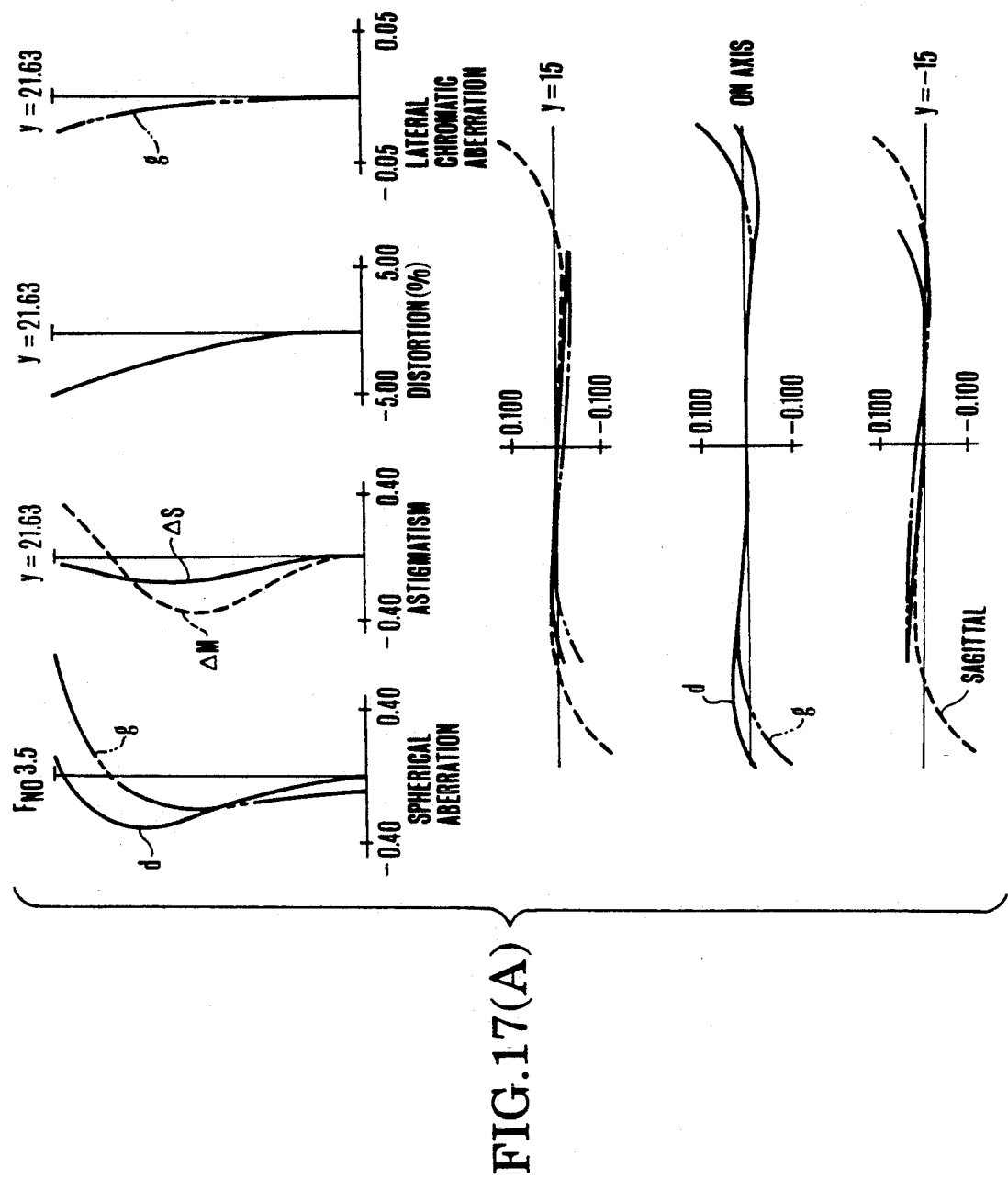
Figure 17C:
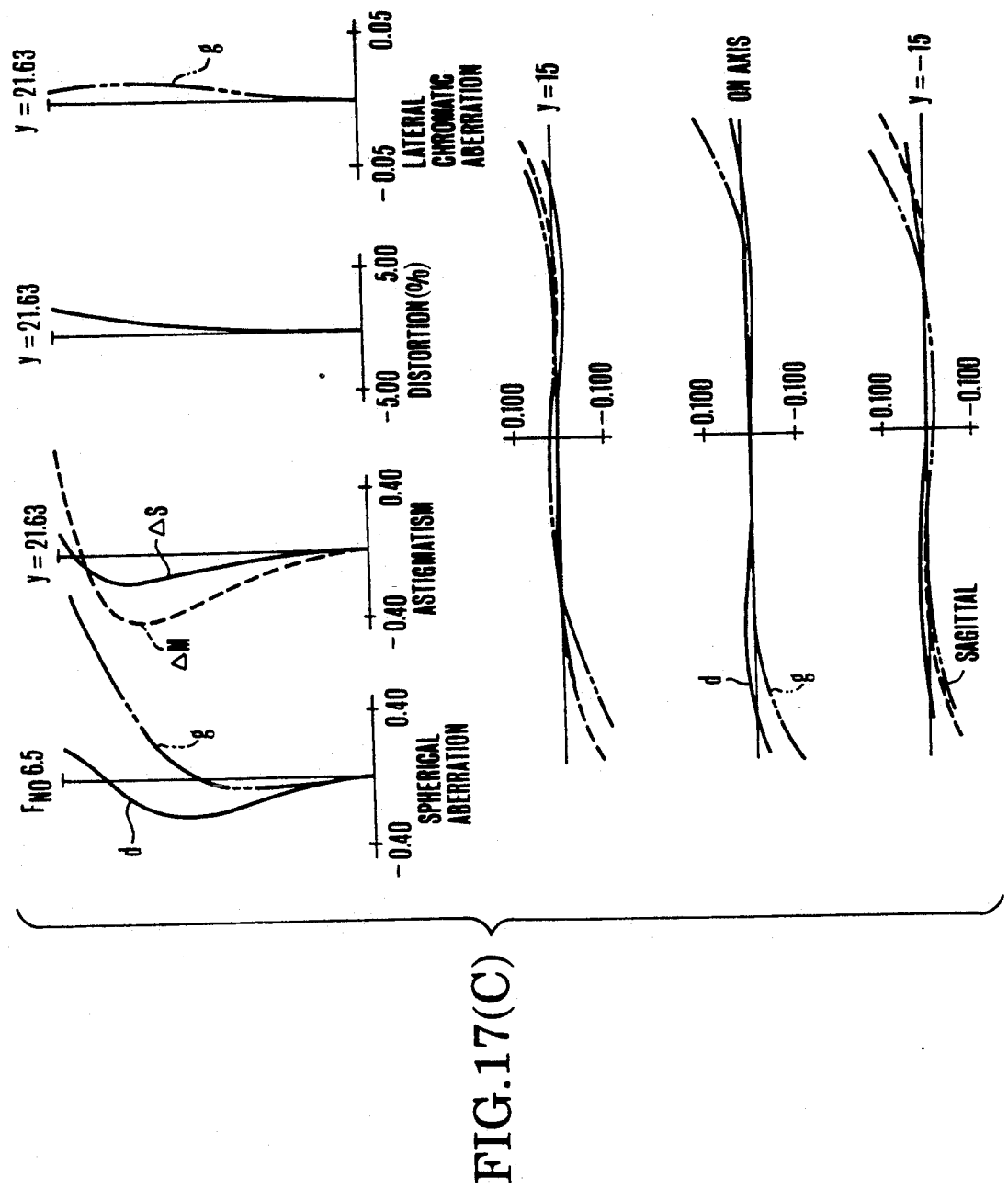
Figure 17D:
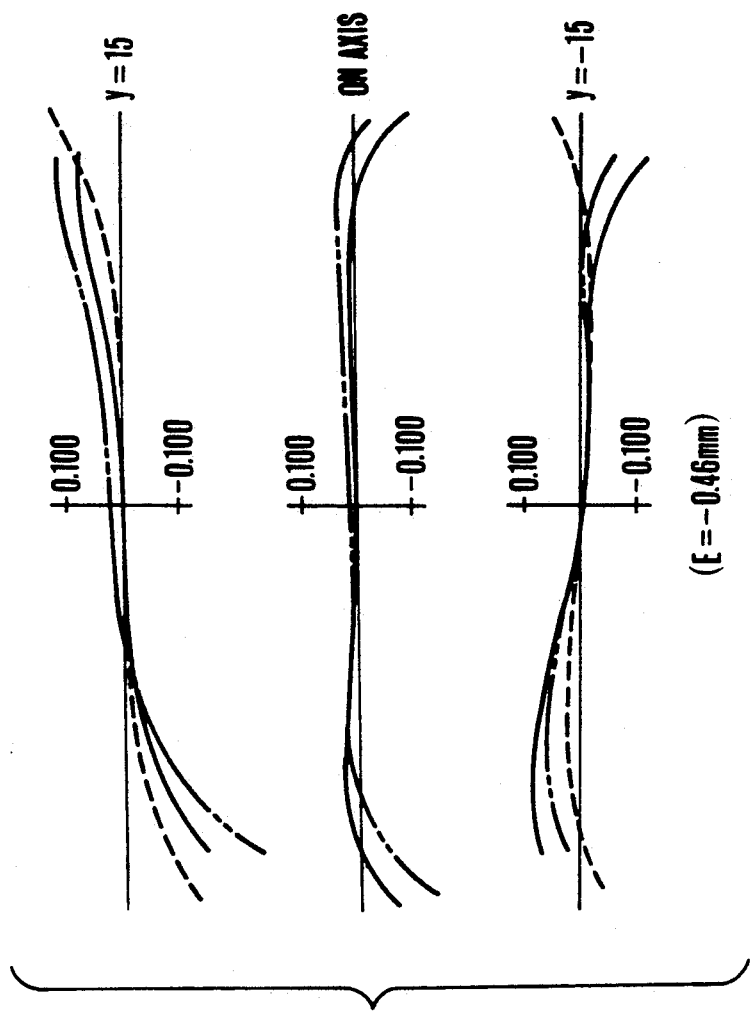

FIGS. 12–14 are lens block diagrams of numerical examples 2–4 of the variable magnification optical system according to the invention respectively. FIGS. 15(A)–15(D), FIGS. 16(A)–16(D) and FIGS. 17(A)–17(D) are respectively various aberration curves of the numerical examples 2–4. In these aberration curves, FIGS. 15(A), 16(A) and 17(A) and 15(C), 16(C) and 17(C) are aberration curves in the normal state respectively at the wide angle end and the telephoto end. FIGS. 15(B), 16(B) and 17(B) and 15(D), 16(D) and 17(D) are lateral aberration curves respectively at the wide angle end and the telephoto end when the variable magnification optical system tilts an angle of ½ degree as a whole, as the compensation is done by the third lens unit.

In the figures, I, II and III are respectively the first, the second and the third lens units. ΔS is the sagittal image surface, and ΔM is the meridional image surface.

Next, the numerical examples 2-4 of the invention are shown. In the numerical examples 2-4, Ri is the radius of curvature of the i-th lens surface counting from the object side, Di is the i-th lens thickness and air separation counting from the object side, Ni and νi are respectively the refractive index and Abbe number of the glass of the i-th lens counting from the object side.

Also, the relation of each of the conditions (B1)–(B6) described above with the various numerical values in the numerical examples 2-4 is shown in Table-5.

| Numerical Example 2 |
|---|
| f = 36.0-77.4   FNo = 1:3.5-6.5   2ω = 30.3°-63.4° |

| | | | |
|---|---|---|---|
| R1 = 74.86 | D1 = 2.00 | N1 = 1.69680 | ν1 = 55.5 |
| R2 = 29.93 | D2 = 3.84 | | |
| R3 = 246.17 | D3 = 1.80 | N2 = 1.59204 | ν2 = 50.5 |
| R4 = 23.34 | D4 = 2.27 | | |
| R5 = 20.07 | D5 = 3.30 | N3 = 1.76272 | ν3 = 29.9 |
| R6 = 36.86 | D6 = Variable | | |
| R7 = 23.19 | D7 = 2.30 | N4 = 1.69680 | ν4 = 55.5 |
| R8 = 182.54 | D8 = 0.15 | | |
| R9 = 22.50 | D9 = 2.20 | N5 = 1.73633 | ν5 = 49.6 |
| R10 = 68.62 | D10 = 0.15 | | |
| R11 = 25.21 | D11 = 2.00 | N6 = 1.77347 | ν6 = 49.6 |
| R12 = 72.32 | D12 = 0.88 | | |
| R13 = −60.51 | D13 = 2.40 | N7 = 1.81292 | ν7 = 24.4 |
| R14 = 14.39 | D14 = 1.82 | | |
| R15 = 791.02 | D15 = 2.50 | N8 = 1.68691 | ν8 = 35.7 |
| R16 = −21.56 | D16 = 1.20 | | |
| R17 = Stop | D17 = Variable | | |
| R18 = −70.71 | D18 = 3.00 | N9 = 1.56090 | ν9 = 35.9 |
| R19 = −14.67 | D19 = 1.50 | | |
| R20 = −11.68 | D20 = 0.80 | N10 = 1.88300 | ν10 = 40.8 |
| R21 = 104.31 | D21 = 0.06 | | |
| R22 = 111.65 | D22 = 3.00 | N11 = 1.58347 | ν11 = 30.2 |
| R23 = −24.38 | | | |

| | f = 36.0 | f = 59.5 | f = 77.4 |
|---|---|---|---|
| D6 | 22.81 | 8.51 | 0.81 |
| D17 | 5.66 | 2.26 | 3.19 |

Aspheric Coefficient R3
$B = -9.349 \times 10^{-6}$   $C = -6.576 \times 10^{-9}$
$D = -6.939 \times 10^{-11}$ Aspheric Coefficient R19
$B = -4.621 \times 10^{-5}$   $C = 3.168 \times 10^{-7}$
$D = -8.952 \times 10^{-9}$

| Numerical Example 3 |
|---|
| f = 36.0-77.4   FNo = 1:3.5-6.5   2ω = 30.3°-63.4° |

| | | | |
|---|---|---|---|
| R1 = −243.21 | D1 = 1.70 | N1 = 1.69680 | ν1 = 43.8 |
| R2 = 19.90 | D2 = 3.32 | | |
| R3 = 23.23 | D3 = 3.80 | N2 = 1.72825 | ν2 = 28.5 |
| R4 = 53.57 | D4 = Variable | | |
| R5 = 32.31 | D5 = 2.30 | N3 = 1.69680 | ν3 = 55.5 |
| R6 = 1136.87 | D6 = 0.15 | | |
| R7 = 19.03 | D7 = 2.00 | N4 = 1.60311 | ν4 = 60.7 |
| R8 = 61.28 | D8 = 0.15 | | |
| R9 = 23.21 | D9 = 2.50 | N5 = 1.60311 | ν5 = 60.7 |
| R10 = 85.18 | D10 = 0.50 | | |
| R11 = −150.19 | D11 = 2.60 | N6 = 1.74077 | ν6 = 27.8 |
| R12 = 13.84 | D12 = 1.13 | | |
| R13 = 60.26 | D13 = 3.50 | N7 = 1.66446 | ν7 = 38.3 |
| R14 = −34.75 | D14 = 1.20 | | |
| R15 = Stop | D15 = Variable | | |
| R16 = −123.24 | D16 = 2.50 | N8 = 1.59270 | ν8 = 35.3 |
| R17 = −16.14 | D17 = 1.61 | | |
| R18 = −13.41 | D18 = 1.00 | N9 = 1.88300 | ν9 = 40.8 |
| R19 = 130.43 | D19 = 0.78 | | |
| R20 = −51.31 | D20 = 2.50 | N10 = 1.59270 | ν10 = 32.8 |
| R21 = −21.99 | | | |

| | f = 36.0 | f = 59.5 | f = 77.4 |
|---|---|---|---|
| D4 | 22.80 | 8.50 | 0.80 |
| D15 | 5.66 | 2.16 | 3.08 |

Aspheric Coefficient R3
$B = -6.910 \times 10^{-9}$   $C = -1.673 \times 10^{-8}$
$D = 3.808 \times 10^{-11}$ Aspheric Coefficient R20
$B = 1.505 \times 10^{-5}$   $C = 8.823 \times 10^{-8}$
$D = -9.685 \times 10^{-11}$

| Numerical Example 4 |
|---|
| f = 36.0-77.4   FNo = 1:3.5-6.5   2ω = 30.3°-63.4° |

| | | | |
|---|---|---|---|
| R1 = −196.77 | D1 = 1.70 | N1 = 1.69680 | ν1 = 47.5 |
| R2 = 20.73 | D2 = 3.46 | | |
| R3 = 24.02 | D3 = 3.80 | N2 = 1.72825 | ν2 = 28.5 |
| R4 = 55.05 | D4 = Variable | | |
| R5 = 27.98 | D5 = 3.00 | N3 = 1.69680 | ν3 = 55.5 |
| R6 = −315.29 | D6 = 0.27 | | |
| R7 = 13.57 | D7 = 3.20 | N4 = 1.56965 | ν4 = 51.3 |
| R8 = 106.57 | D8 = 0.52 | | |
| R9 = −108.60 | D9 = 2.60 | N5 = 1.80518 | ν5 = 25.4 |
| R10 = 12.98 | D10 = 2.74 | | |
| R11 = 31.00 | D11 = 3.50 | N6 = 1.66446 | ν6 = 35.8 |
| R12 = −29.88 | D12 = 1.20 | | |
| R13 = Stop | D13 = Variable | | |
| R14 = −899.57 | D14 = 2.50 | N7 = 1.56090 | ν7 = 35.9 |
| R15 = −15.78 | D15 = 1.63 | | |
| R16 = −13.10 | D16 = 1.00 | N8 = 1.80610 | ν8 = 40.9 |
| R17 = 33.08 | D17 = 0.15 | | |
| R18 = 34.12 | D18 = 2.50 | N9 = 1.58347 | ν9 = 30.2 |
| R19 = 555.62 | | | |

| | f = 36.0 | f = 60.5 | f = 77.4 |
|---|---|---|---|
| D4 | 22.84 | 7.64 | 0.84 |
| D13 | 4.52 | 2.23 | 2.74 |

Aspheric Coefficient R3
$B = -1.202 \times 10^{-6}$   $C = -4.505 \times 10^{-9}$
$D = 5.615 \times 10^{-12}$ Aspheric Coefficient R15
$B = -1.537 \times 10^{-5}$   $C = 3.07 \times 10^{-7}$
$D = -5.578 \times 10^{-9}$

TABLE 5

| | | Numerical Example | | |
|---|---|---|---|---|
| Condition | | 2 | 3 | 4 |
| (B1) | $R_{3-2}/R_{3-1}$ | 0.21 | 0.13 | 0.02 |
| (B2) | $R_{3-2}/fw$ | −0.42 | −0.46 | −0.45 |
| (B3) | $R_{3-3}/fw$ | −0.33 | −0.38 | −0.37 |
| (B4) | $R_{3-3}/R_{3-4}$ | −0.11 | −0.10 | −0.40 |
| (B5) | $\overline{NN} - \overline{NP}$ | 0.31 | 0.29 | 0.23 |

TABLE 5-continued

| Condition | Numerical Example | | |
|---|---|---|---|
| | 2 | 3 | 4 |
| (B6)   fw/f3 | −0.69 | −0.69 | −1.08 |

According to the invention, of the lens units constituting the variable magnification optical system, at least one lens unit which satisfies the above-described conditions is made to decenter to compensate for the deviation of the image and at the same time the amount of decentering aberrations produced in accompaniment with the decentering are as far suppressed as possible. Thus, it becomes possible to achieve a variable magnification optical system having the vibration-proof function capable of maintaining high optical performance.

It should be noted that this invention may be applied to an optical system, for example, a telescope, comprised of an image forming system having a zooming section and an eyepiece system for observing an image formed by the image forming system. An image can be stabilized by decentering a part of the image forming system having the zooming section.

In addition, this invention may be applied to the so-called two-unit type zoom lens comprised of two lens units of, from front to rear, positive and negative refractive power, in which zooming is effected by varying a lens separation and focusing is effected by moving a sub-lens unit of the lens unit of positive refractive power. In this case, that sub-lens unit to be moved or another sub-lens unit of the lens unit of positive refractive power may serve as a compensating unit.

What is claimed is:

1. An image stabilizing system comprising:
   photographic lens means including a plurality of lens units, wherein for zooming, at least one lens separation varies;
   deviation detecting means for detecting deviation of an image due to vibration; and
   drive means for driving at least one lens unit adjacent to said lens separation in a direction perpendicular to a photographic optical axis of said photographic lens means on the basis of an output of said deviation detecting means in order to stabilize an image, wherein said system satisfies the following conditions:

$$0.1 < |(1-\beta p)\cdot\beta q| < 10$$

$$0.02 < |fP/fT| < 5$$

where fP is the focal length of said lens unit to be driven, fT is the focal length of the photographic lens means at the telephoto end, βp is the paraxial lateral magnification of said lens unit to be driven in an arbitrary magnification varying position, and βq is the paraxial lateral magnification of the entire portion of the photographic lens means which is arranged on the image side of said lens unit to be driven.

2. A system according to claim 1, wherein when said photographic lens means having a focal length f in an arbitrary magnification varying position tilts an angle ε as a whole to deviate a photographic image, said lens unit to be driven is parallel-decentered by f·ε/((1−Bp)·Bq).

3. A system according to claim 1, satisfying the following condition:

$$0.1 < |fO/fP| < 10$$

where fO is the overall focal length of the portion of the photographic lens means which is arranged on the object side of said lens unit to be driven in an arbitrary magnification varying position and fP represents a focal length of the lens unit to be driven.

4. A system according to claim 1, satisfying the following condition:

$$0.1 < |fq/fP| < 10$$

where fq is the overall focal length of the portion of said photographic lens means which is arranged on the image side of said lens unit to be driven in an arbitrary magnification varying position, and fP is the focal length of said lens unit to be driven.

5. A system according to claim 1, wherein said lens unit to be driven is a front lens unit locating at the frontmost position in said photographic lens means, and satisfies the following condition:

$$0.2 < |f1/fT| < 5$$

where f1 is the focal length of said front lens unit, and fT is the focal length of the photographic lens means at the telephoto end.

6. An image stabilizing device comprising:
   photographic lens means including a compensating lens unit and a lens unit positioned adjacent to said compensation lens unit by a variable separation for zooming therebetween; wherein said compensating lens unit and said lens unit each includes a lens of positive refractive power and a lens of negative refractive power, and wherein said photographic lens means satisfies the following condition:

$$0.02 < |fp|/ft < 10$$

where fp is the focal length of said compensating lens unit, ft is the focal length of said photographic lens means of the telephoto end;
   driving means for driving said compensating lens unit in a direction for decentering with respect to an optical axis of said photographic lens means; and
   control means for controlling the drive amount of said driving means on the basis of deviation information of an image formed by said photographic lens means.

7. A device according to claim 6, wherein for focusing, said photographic lens means is performed by moving said compensating lens unit along the optical axis.

8. A device according to claim 6, wherein for zooming, said photographic lens means is performed by moving said compensating lens unit along the optical axis.

9. A device according to claim 8, satisfying the following conditions:

$$0.1 < |(1-\beta p)\cdot\beta q| < 10$$

$$0.02 < |fP/fT| < 5$$

where fP is the focal length of said compensating lens unit, fT is the focal length of the photographic lens means at the telephoto end, βp is the paraxial lateral magnification of said compensating lens unit in an arbitrary magnification varying position, and βq is the paraxial lateral magnification of the entire portion of the photographic lens means which is arranged on the image side of said compensating lens unit.

10. A device according to claim 8, satisfying the following condition:

$$0.1 < |fO/fP| < 10$$

where fO is the overall focal length of the portion of the photographic lens means which is arranged on the object side of said compensating lens unit in an arbitrary magnification varying position, and fP is the focal length of said compensation lens unit.

11. A device according to claim 8, wherein said compensating lens unit is a front lens unit at the frontmost position in said photographic lens means, and satisfies the following condition:

$$0.2 < |f1/fT| < 5$$

where f1 is the focal length of said front lens unit, and fT is the focal length of the photographic lens means at the telephoto end.

12. A device according to claim 8, wherein said compensating lens unit is positioned at the rearmost position, and said device satisfies the following conditions:

$$-10 < fT/PT < 10$$

$$-9 < \beta p < 10$$

where $\beta P$ is its paraxial lateral magnification of said compensating lens unit, fT is the focal length of the photographic lens means at the telephoto end, and PT is the distance from the exit pupil of said photographic lens means at the telephoto end to the image plane.

13. A device according to claim 8, wherein said photographic lens means includes, from front to rear, said lens unit and said compensating lens unit, said lens unit having a positive refractive power and said compensating lens unit having a negative refractive power.

14. A device according to claim 8, wherein said lens unit lies on the object side of said compensating lens unit, and includes a first lens unit and a second lens unit, said first lens unit having a negative refractive power, said second lens unit having a positive refractive power, and said compensating lens unit having a negative refractive power.

15. A device according to claim 14, wherein said compensating lens unit includes, from front to rear, a positive first lens, a negative second lens and a positive third lens.

16. A device according to claim 13, satisfying the following condition:

$$\overline{NN} - \overline{NP} < 0.15$$

where $\overline{NP}$ is the mean refractive index of materials of said first lens and said third lens, and $\overline{NN}$ is the refractive index of a material of said second lens.

17. A device according to claim 14, satisfying the following condition:

$$-1.8 < fw/f3 < -0.5$$

where f3 is the focal length of said compensating lens unit, and fw is the focal length of the photographic lens means at the wide-angle end.

18. A device according to claim 8, further comprising:

position detecting means for detecting the position of said compensating lens unit.

19. A device according to claim 18, wherein said control means computes the drive amount on the basis of position information output from said position detecting means.

20. An image stabilizing zoom optical system comprising:
photographic means including a plurality of lens units and at least one lens separation which changes for zooming or focusing;
deviation detecting means for detecting deviation of an image due to vibration; and
drive means for driving at least one lens unit adjacent to said lens separation in a direction for decentering with respect to a photographic optical axis of said photographic lens means on the basis of an output of said detecting means to stabilize an image, wherein said system satisfies the following conditions:

$$0.1 < |(1-\beta p) \cdot \beta q| < 10$$

$$0.02 < |fP/fT| < 5$$

where fP is the focal length of said lens unit to be driven, fT is the focal length of the photographic lens means at the telephoto end, $\beta p$ is the paraxial lateral magnification of said lens unit to be driven in an arbitrary magnification varying position, and $\beta q$ is the paraxial lateral magnification of that portion of the overall photographic lens means which is arranged on the image side of said lens unit to be driven.

21. A system according to claim 20, wherein when said photographic lens means having a focal length f in an arbitrary magnification varying position tilts an angle $\epsilon$ as a whole to deviate a photographic image, said lens unit to be driven is parallel-decentered by $-f \cdot \epsilon/(1-Bp) \cdot Bq)$.

22. A system according to claim 20, satisfying the following condition:

$$0.1 < |fO/fP| < 10$$

where fO is the overall focal length of the portion of the photographic lens means which is arranged on the object side of said lens unit to be driven in an arbitrary magnification varying position and fP represents a focal length of the lens unit to be driven.

23. An image stabilizing system comprising:
photographic lens means including a plurality of lens units, wherein for zooming, at least one lens separation varies;
deviation detecting means for detecting deviation of an image due to vibration; and
drive means for driving at least one lens unit adjacent to said lens separation in a direction perpendicular to a photographic optical axis of said photographic lens means on the basis of an output of said deviation detecting means in order to stabilize an image, wherein said lens unit to be driven is a front lens unit located at the frontmost position in said photographic lens means, wherein said system satisfies the following condition:

$$0.2 < |f1/fT| < 5$$

where f1 is the focal length of said front lens unit, and fT is the focal length of the photographic lens means at the telephoto end.

24. A system according to claim 23, wherein when said photographic lens means tilts an angle $\epsilon$ as a whole to deviate a photographic image, said front lens unit parallel-decenters by $|f1\cdot\epsilon|$.

25. An image stabilizing system comprising:
photographic lens means including a plurality of lens units, wherein for zooming, at least one lens separation varies;
deviation detecting means for detecting deviation of an image due to vibration; and
drive means for driving at least one lens unit adjacent to said lens separation in a direction perpendicular to a photographic optical axis of said photographic lens means on the basis of an output of said deviation detecting means in order to stabilize an image, wherein said system satisfies the following conditions:

$$0.02 < |fP|/fT < 10$$

$$-10 < fT/PT < 10$$

$$-9 < \beta p < 10$$

where fP is the focal length of a last lens unit, said photographic lens means, $\beta p$ is the paraxial lateral magnification of the lens unit to be driven, fT is the focal length of said photographic lens means at a telephoto end, and PT is a distance from an exit pupil at the telephoto end to the image plane, wherein said drive means decenters said last lens unit.

26. A system according to claim 25, wherein said photographic lens means includes, from front to rear, a first lens unit and a second lens unit, the signs of the refractive powers of said first and second lens units being different from each other.

27. A system according to claim 26, wherein said photographic lens means further includes a third lens unit on the image side thereof, wherein said first lens unit has a negative refractive power, said second lens unit has a positive refractive power, and said third lens unit has a negative refractive power.

28. A system according to claim 27, wherein zooming is performed by varying lens unit separations formed by said first lens unit, said second lens unit and said third lens unit.

29. A system according to claim 28, wherein said third lens unit includes, from front to rear, a first lens having a positive refractive power, a second lens having a negative refractive power, and a third lens having a positive refractive power.

30. A system according to claim 29, satisfying the following conditions:

$$-0.4 < R_{3-2}/R_{3-1} < 0.4$$

$$-0.7 < R_{3-2}/fw < -0.1$$

$$-0.7 < R_{3-3}/fw < -0.1$$

$$-0.5 < R_{3-3}/R_{3-4} < 0$$

where $R_{3-i}$ is the radius of curvature of the i-th lens surface counting from the object side of said third lens unit, and fw is the focal length of the photographic lens means at the wide-angle end.

31. A system according to claim 29, satisfying the following condition:

$$\overline{NN} - \overline{NP} < 0.15$$

where $\overline{NP}$ is the mean refractive index of materials of the first lens and the third lens, and $\overline{NN}$ is the refractive index of a material of the second lens.

32. A system according to claim 29, satisfying the following condition:

$$-1.8 < fw/f3 < -0.5$$

where f3 is the focal length of said third lens unit, and fw is the focal length of the photographic lens means at the wide-angle end.

33. An image stabilizing zoom optical system comprising:
photographic lens means including a plurality of lens units and at least one lens separation which changes for zooming or focusing;
deviation detecting means for detecting deviation of an image due to vibration; and
drive means for driving at least one lens unit adjacent to said lens separation in a direction for decentering with respect to a photographic optical axis of said photographic lens means on the basis of an output of said detecting means to stabilize an image, wherein said system satisfies the following condition:

$$0.1 < |fq/fP| < 10$$

where fq is the overall focal length of those lens units which are arranged on the image side of said lens unit to be driven in an arbitrary magnification varying position, and fP is the focal length of said lens unit to be driven.

* * * * *

UNITED STATES PATENT AND TRADEMARK OFFICE
CERTIFICATE OF CORRECTION

PATENT NO. : 5,270,857
DATED : December 14, 1993
INVENTOR(S) : OIZUMI, ET AL.

It is certified that error appears in the above-indentified patent and that said Letters Patent is hereby corrected as shown below:

TITLE PAGE
    [75] Inventors, "Shoichi Yamazaki," should read --Shoichi Yamazaki,--; "Kanagawa" (first occurrence) should read --Yokohama--; "Tokyo" should read --Hachioji--; and, "Kanagawa" (second occurrence) should read --Yokohama--.
    [56] References Cited, "55-21133 2/1981 Japan" should read --56-21133 2/1981 Japan--.

COLUMN 1
    Line 16, "role" should read --the role--.

COLUMN 2
    Line 3, "No. 4,844,602" should read --No. 4,844,602,--.
    Line 4, "abandoned" should read --abandoned,--.

COLUMN 4
    Line 64, "angle E" should read --angle $\epsilon$--.

COLUMN 6
    Line 30, "to" should be deleted.
    Line 48, "equation (2)" should read --equation (3)--.
    Line 54, "f/(1-Bp).Bq)" should read --$f/((1-\beta p) \cdot \beta q)$--.

COLUMN 7
    Line 27, "$1(1-\beta p) \cdot \beta q > 0.1$      ($A_0$)" should read --$1(1-\beta p) \cdot \beta q1 > 0.1$      ($A_0$)--.
    Line 53, "amount AY(E)" should read --amount $\Delta Y(E)$--.

UNITED STATES PATENT AND TRADEMARK OFFICE
CERTIFICATE OF CORRECTION

PATENT NO. : 5,270,857
DATED : December 14, 1993
INVENTOR(S) : OIZUMI, ET AL.

It is certified that error appears in the above-indentified patent and that said Letters Patent is hereby corrected as shown below:

COLUMN 8

Line 8, "lens p,p" should read --lens p, $\alpha p'$--; and "$\overline{\alpha' p}$" should read --$\overline{\alpha p}$--.

Line 11, "$\overline{\alpha' p}$" should read --$\overline{\alpha p'}$--.

Line 37, "a'$_p$I$_q$+$\alpha_p$(I$_p$+I$_q$)" should read --$\overline{\alpha'}_p$I$_q$+$\overline{\alpha}_p$(I$_p$+I$_q$)--.

Line 38, "(h$_p\phi_p$I$_q$-$\alpha_p$I$_p$)" should read --($\overline{h}_p\phi_p$I$_q$-$\overline{\alpha}_p$I$_p$)--.

Line 40, "$\alpha'_p$II$_q$+$\alpha_p$(II$_p$+II$_q$)" should read --$\overline{\alpha}'_p$II$_q$+$\overline{\alpha}_p$(II$_p$+II$_q$)--.

Line 41, "(h$_p\phi_p$II$_q$-$\alpha_p$II$_p$)" should read --($\overline{h}_p\phi_p$II$_q$-$\overline{\alpha}_p$II$_p$)--.

Line 46, "a'$_p$III$_q$+$\alpha_p$ (III$_p$+III$_q$)" should read --$\overline{\alpha}'_p$III$_q$+$\overline{\alpha}_p$(III$_p$+III$_q$)--.

Line 47, "(h$_p\phi_p$III$_q$-$\alpha_p$III$_p$)" should read --($\overline{h}_p\phi_p$III$_q$-$\overline{\alpha}_p$III$_p$)--.

Line 49, "$\alpha'_p$P$_q$-$\alpha_p$(P$_p$+P$_q$)" should read --$\overline{\alpha}'_p$P$_q$-$\overline{\alpha}_p$(P$_p$+P$_q$)--.

Line 50, "=h$_p\phi_p$P$_q$-$\alpha_p$P$_p$" should read --=$\overline{h}_p\phi_p$P$_q$-$\overline{\alpha}_p$P$_p$--.

Line 66, "height h" should read --height $\overline{h}$--.

COLUMN 9

Line 40, "pulling out" should read --putting out--.
Line 53, "almost" should be deleted.

COLUMN 11

Line 36, "respectfully" should read --respectively--.

UNITED STATES PATENT AND TRADEMARK OFFICE
CERTIFICATE OF CORRECTION

PATENT NO. : 5,270,857
DATED : December 14, 1993
INVENTOR(S) : OIZUMI, ET AL.

It is certified that error appears in the above-indentified patent and that said Letters Patent is hereby corrected as shown below:

COLUMN 12
Line 8, "$S=(1-B_p)B_q$" should read --$S=(1-\beta_p)\beta_q$--.
Line 34, "the formula 4" should read --equation (4)--.
Line 63, "$0.02<fP/fT<10$     (A6)" should read --$0.02<|fP|/fT<10$     (A6)--.
Line 67, "$-9<\beta p<10$     (A8)" should read --$9<\beta P<10$     (A8)--.

COLUMN 14
Line 56, "i th" should read --i-th--.
Line 57, "i th" should read --i-th--.

COLUMN 15
Line 16, after "$E=1.304 \times 10^{-13}$" insert --

|      | f=36  | f=50  | f=68 |
|------|-------|-------|------|
| D 4  | 19.87 | 12.08 | 3.19 |
| D 12 | 11.23 | 6.76  | 5.45 |

Table for the decenter responsiveness $(1-\beta p)\beta q$ of each lens unit

| Zooming Position | First Lens Unit | Second Lens Unit | Third Lens Unit |
|------|-------|------|-------|
| f=36 | -0.53 | 1.85 | -0.3  |
| f=68 | -1.00 | 2.87 | -0.84 |

--.

UNITED STATES PATENT AND TRADEMARK OFFICE
CERTIFICATE OF CORRECTION

PATENT NO. : 5,270,857
DATED : December 14, 1993
INVENTOR(S) : OIZUMI, ET AL.

It is certified that error appears in the above-indentified patent and that said Letters Patent is hereby corrected as shown below:

COLUMN 15
    Table 2, "7.44" should read --457.44--.
             "0.55" should read --680.55--.
             "1.37" should read --811.37--.
             "5.49" should read --965.49--.
             "9.99" should read --489.99--.
             "7.74" should read --727.74--.
             "6.63" should read --866.63--.
             "0.42" should read --1030.42--.

Table 3, "7.44" should read --457.44--.
             "0.55" should read --680.55--.
             "1.37" should read --811.37--.
             "5.49" should read --965.49--.

COLUMN 17
    Table 3, "89.99" should read --489.99--.
             "27.74" should read --727.74--.
             "66.63" should read --866.63--.
             "30.42" should read --1030.42--.

"TABLE 3" should read --TABLE 4--.
    Table 3[(4)], "57.44" should read --457.44--; "80.55" should read --680.55--; "11.37" should read --811.37--; "65.49" should read --965.49--; and, "030.42" should read --1030.42--.
    Line 58, "condition:" should read --conditions:--

COLUMN 18
    Line 53, "to turn the" should read --a--.

UNITED STATES PATENT AND TRADEMARK OFFICE
CERTIFICATE OF CORRECTION

PATENT NO. : 5,270,857
DATED : December 14, 1993
INVENTOR(S) : OIZUMI, ET AL.

It is certified that error appears in the above-indentified patent and that said Letters Patent is hereby corrected as shown below:

COLUMN 19
    Line 14, "$\overline{NN}-\overline{NP}<0.15$   (B5)" should read --$\overline{NN}-\overline{NP}>0.15$   (B5)--.
    Line 51, "formula 6," should read --condition (B6),--.
    Line 64, "this time" should read --this embodiment--.

COLUMN 20
    Line 16, "formula (B7)" should read --condition (B7)--.
    Line 17, "formula" should read --condition--.

COLUMN 23
    Line 66, "$f\cdot\epsilon/((1-Bp)\cdot Bq)$." should read --$f\cdot\epsilon/((1-\beta p)\cdot\beta q)$.--.

COLUMN 25
    Line 30, "$\beta P$" should read --$\beta p$--and Q: "its" should read --the--.
    Line 51, "claim 13," should read --claim 15,--.
    Line 54, "$\overline{NN}-\overline{NP}<0.15$" should read --$\overline{NN}-\overline{NP}>0.15$--.

COLUMN 26
    Line 9, "photographic means" should read --photographic lens means--.
    Line 39, "$-f\cdot\epsilon/(1-Bp)\cdot Bq)$." should read --$f\cdot\epsilon/(1-\beta p)\cdot\beta q)$.--.

UNITED STATES PATENT AND TRADEMARK OFFICE
CERTIFICATE OF CORRECTION

PATENT NO. : 5,270,857
DATED : December 14, 1993
INVENTOR(S) : OIZUMI, ET AL.

It is certified that error appears in the above-indentified patent and that said Letters Patent is hereby corrected as shown below:

COLUMN 27
Line 28, "said" should read --in said--.

COLUMN 28
Line 20, "$\overline{NN}-\overline{NP}<0.15$" should read --$\overline{NN}-\overline{NP}>0.15$--.

Signed and Sealed this

Fifteenth Day of November, 1994

Attest:

BRUCE LEHMAN

Attesting Officer   Commissioner of Patents and Trademarks